US012167793B2

(12) United States Patent
Paz

(10) Patent No.: US 12,167,793 B2
(45) Date of Patent: Dec. 17, 2024

(54) TILTING/LIFTING CHAIR

(71) Applicant: Ohad Paz, Plantation, FL (US)

(72) Inventor: Ohad Paz, Plantation, FL (US)

(73) Assignee: Ohad Paz, Plantation, FL (US)

( * ) Notice: Subject to any disclaimer, the term of this patent is extended or adjusted under 35 U.S.C. 154(b) by 153 days.

(21) Appl. No.: 17/777,038

(22) PCT Filed: Mar. 3, 2020

(86) PCT No.: PCT/IB2020/051785
§ 371 (c)(1),
(2) Date: May 15, 2022

(87) PCT Pub. No.: WO2021/094838
PCT Pub. Date: May 20, 2021

(65) Prior Publication Data

US 2022/0386776 A1 Dec. 8, 2022

Related U.S. Application Data

(63) Continuation-in-part of application No. 16/683,299, filed on Nov. 14, 2019, now abandoned.
(Continued)

(51) Int. Cl.
*A47C 1/024* (2006.01)
*A47C 1/03* (2006.01)
(Continued)

(52) U.S. Cl.
CPC .......... *A47C 1/0242* (2013.01); *A47C 1/0244* (2013.01); *A47C 1/03* (2013.01);
(Continued)

(58) Field of Classification Search
CPC ........ A61G 5/14; A47C 3/0251; A47C 1/0242
(Continued)

(56) References Cited

U.S. PATENT DOCUMENTS 206,379 A * 7/1878 Wilson ................ B60N 2/2252 297/282
463,863 A * 11/1891 Johnson ................ A47C 1/035 297/282
(Continued)

FOREIGN PATENT DOCUMENTS

CN 101247749 8/2008
FR 2677237 A1 * 12/1992 .............. A61G 5/14
(Continued)

OTHER PUBLICATIONS

International Search Report and the Written Opinion Dated Jul. 24, 2020 From the International Searching Authority Re. Application No. PCT/IB2020/051785. (14 Pages).
(Continued)

*Primary Examiner* — Rodney B White

(57) ABSTRACT

According to an aspect of some embodiments of the present disclosure there is provided a chair including a base component, a seat component connected to the base component by a central hinge, and a back-rest component connected to the seat component by a back hinge, wherein when the chair is in a sitting position, the seat component is lower than the central hinge. Related apparatus and methods are also described.

37 Claims, 12 Drawing Sheets

Related U.S. Application Data

(60) Provisional application No. 62/766,970, filed on Nov. 14, 2018.

(51) Int. Cl.
*A47C 7/50* (2006.01)
*A47C 7/72* (2006.01)
*A61G 5/14* (2006.01)

(52) U.S. Cl.
CPC .............. *A47C 7/5066* (2018.08); *A47C 7/72* (2013.01); *A61G 5/14* (2013.01)

(58) Field of Classification Search
USPC ....... 297/118, 281, 282, 464, 465, 466, 486, 297/487, 488, DIG. 10, 330
See application file for complete search history.

(56) References Cited

U.S. PATENT DOCUMENTS

| | | | | | |
|---|---|---|---|---|---|
| 465,275 | A * | 12/1891 | Kennedy et al. | A47C 3/0255 | 297/277 |
| 648,740 | A * | 5/1900 | Haggard et al. | A47C 1/035 | 297/277 X |
| 674,910 | A * | 5/1901 | Dutton | A47D 1/004 | 297/281 X |
| 766,836 | A * | 8/1904 | Miller et al. | A47C 1/035 | 297/282 |
| 825,984 | A * | 7/1906 | Schmersahl | A47C 1/035 | 297/282 |
| 898,305 | A * | 9/1908 | Barnhart | A47C 1/035 | 297/277 X |
| 2,679,893 | A | 6/1954 | Bennett | | |
| 3,711,152 | A * | 1/1973 | Sirpak | A47C 9/00 | 297/282 |
| 3,964,786 | A * | 6/1976 | Mashuda | A61G 5/006 | 297/DIG. 10 |
| 4,145,083 | A * | 3/1979 | Urban | A61G 5/00 | 297/486 X |
| 4,341,420 | A * | 7/1982 | Knowles | A47C 3/0255 | 297/69 |
| 4,529,246 | A | 7/1985 | Leib | | |
| 4,861,106 | A * | 8/1989 | Sondergeld | A47C 1/03294 | 297/316 |
| 5,005,905 | A * | 4/1991 | Sondergedl | A47C 1/03294 | 297/320 |
| 5,447,356 | A * | 9/1995 | Snijders | A47C 7/405 | 297/486 X |
| 5,653,465 | A * | 8/1997 | Ferrero | B60N 2/914 | 297/464 X |
| 5,662,384 | A | 9/1997 | O'Neill et al. | | |
| 5,803,545 | A * | 9/1998 | Guguin | A61G 5/14 | 297/DIG. 10 |
| 5,984,409 | A * | 11/1999 | Eakin | A47C 3/0255 | 297/282 |
| 6,000,758 | A * | 12/1999 | Schaffner | A47C 1/0345 | 297/DIG. 10 |
| 6,022,076 | A * | 2/2000 | Samson | A47C 3/0255 | 297/282 |
| 6,056,362 | A | 5/2000 | De la Haye | | |
| 6,135,554 | A * | 10/2000 | Tsun | A47C 1/027 | 297/282 |
| 6,325,455 | B1 * | 12/2001 | Chung | A47C 1/0342 | 297/282 |
| 6,435,611 | B1 * | 8/2002 | Walter | A61H 1/0222 | 297/316 X |
| 7,237,848 | B1 * | 7/2007 | Story | B60N 2/665 | 297/464 X |
| 7,472,956 | B2 * | 1/2009 | Makhsous | A61G 5/1091 | 297/464 |
| 7,575,279 | B2 * | 8/2009 | Robertson | A47C 7/506 | 297/DIG. 10 |
| 7,708,093 | B1 * | 5/2010 | Baker | A61G 5/14 | 180/65.1 |
| 7,896,442 | B2 * | 3/2011 | White | A47C 7/503 | 297/DIG. 10 X |
| 8,104,123 | B2 | 1/2012 | Paz et al. | | |
| 8,117,695 | B2 | 2/2012 | Paz et al. | | |
| 9,173,792 | B2 * | 11/2015 | Goffer | A61G 5/128 | |
| 9,626,878 | B2 | 4/2017 | Rekimoto | | |
| 9,861,542 | B2 * | 1/2018 | Christian | A61G 5/1072 | |
| 9,944,208 | B2 * | 4/2018 | Cheng | A61G 5/128 | |
| 9,999,557 | B2 * | 6/2018 | Diaz-Flores | G16H 20/30 | |
| 10,004,334 | B2 * | 6/2018 | Robertson | A47C 1/029 | |
| 10,085,906 | B2 * | 10/2018 | Zhao | A61G 5/14 | |
| 10,172,752 | B2 * | 1/2019 | Goffer | A61G 5/04 | |
| 10,245,195 | B2 * | 4/2019 | Feldman | A47C 7/506 | |
| 10,327,970 | B2 * | 6/2019 | Christian | A47C 3/18 | |
| 10,525,784 | B2 * | 1/2020 | Goffer | A61G 5/1048 | |
| 2005/0046255 | A1 | 3/2005 | Bressler et al. | | |
| 2007/0001499 | A1 | 1/2007 | Smith | | |
| 2007/0157376 | A1 | 7/2007 | Paz et al. | | |
| 2007/0169270 | A1 * | 7/2007 | Chai | A61G 5/006 | 5/620 |
| 2011/0248530 | A1 * | 10/2011 | Sartisohn | A47C 1/034 | 297/83 |
| 2013/0111669 | A1 * | 5/2013 | Parson | A61G 5/1059 | 5/619 |
| 2015/0165265 | A1 * | 6/2015 | Tholkes | A61H 1/0262 | 482/57 |
| 2015/0209207 | A1 * | 7/2015 | Cooper | A61G 5/1056 | 701/49 |
| 2015/0257950 | A1 * | 9/2015 | Ten Holter | A61G 5/1072 | 297/316 |
| 2016/0058194 | A1 | 3/2016 | Zhang et al. | | |
| 2016/0270988 | A1 * | 9/2016 | Diaz-Flores | A61G 5/1024 | |
| 2018/0271287 | A1 | 9/2018 | Jacobs et al. | | |
| 2019/0053970 | A1 | 2/2019 | Vatti | | |
| 2019/0105530 | A1 * | 4/2019 | Tholkes | A61G 5/14 | |
| 2019/0183706 | A1 * | 6/2019 | Shimizu | A61G 7/1019 | |
| 2019/0201260 | A1 * | 7/2019 | Isozumi | A61G 7/1086 | |
| 2019/0282431 | A1 * | 9/2019 | Moore | A61G 5/14 | |
| 2020/0229998 | A1 | 7/2020 | Paz | | |

FOREIGN PATENT DOCUMENTS

| | | | | |
|---|---|---|---|---|
| FR | 2969472 | | 6/2012 | |
| JP | 2005-211294 | | 8/2005 | |
| JP | 2008-540019 | | 11/2008 | |
| WO | WO-9317649 | A1 * | 9/1993 | A61G 5/006 |
| WO | WO-0247513 | A1 * | 6/2002 | A47C 1/035 |
| WO | WO-2018134554 | A1 * | 7/2018 | A47C 1/022 |
| WO | WO 2021/094838 | | 5/2021 | |

OTHER PUBLICATIONS

Notice of Reason(s) for Rejection Dated Nov. 21, 2023 From the Japan Patent Office Re. Application No. 2022-528346 and Its Translation Into English. (12 Pages).
International Preliminary Report on Patentability Dated May 27, 2022 From the International Bureau of WIPO Re. Application No. PCT/IB2020/051785. (12 Pages).
Notification of Office Action and Search Report Dated Nov. 29, 2023 From The State Intellectual Property Office of the People's Republic of China Re. Application No. 202080072354.0. (9 Pages).
Notice of Reason(s) for Rejection Dated May 21, 2024 From the Japan Patent Office Re. Application No. 2022-528346 and Its Translation Into English. (22 Pages).

* cited by examiner

TILTING/LIFTING CHAIR

RELATED APPLICATION/S

This application is a National Phase of PCT Patent Application No. PCT/IB2020/051785 having the International filing date of Mar. 3, 2020, which is a Continuation in Part of U.S. Non-Provisional patent application Ser. No. 16/683,299 filed on Nov. 14, 2019 and now abandoned, which claims the benefit of priority under 35 USC § 119(e) of U.S. Provisional Patent Application No. 62/766,970 filed on Nov. 14, 2018.

The contents of the above applications are all incorporated by reference as if fully set forth herein in their entirety.

FIELD AND BACKGROUND

The present disclosure, in some embodiments thereof, relates to a chair for assisting a user to stand or reach a vertical position, and, more particularly, but not exclusively, to a tilting or lifting chair.

Additional background art includes:

U.S. Pat. No. 8,104,123 to Paz et al.; and

U.S. Pat. No. 8,117,695 to Paz et al.

The disclosures of all references mentioned above and throughout the present specification, as well as the disclosures of all references mentioned in those references, are hereby incorporated herein by reference.

SUMMARY

The present disclosure, in some embodiments thereof, relates to a chair for assisting a user to stand or reach a vertical position, and, more particularly, but not exclusively, to a tilting or lifting chair capable of reaching any position and/or angle between sitting, lying flat, lying at a negative angle (Trendelenburg), and tilted at any angle up to fully vertical (standing).

According to an aspect of some embodiments of the present disclosure there is provided a chair including a base component, a seat component connected to the base component by a central hinge, and a back-rest component connected to the seat component by a back hinge, wherein when the chair is in a sitting position, the seat component is lower than the central hinge.

According to some embodiments of the disclosure, further including at least one actuator for changing an angle between components of the chair.

According to some embodiments of the disclosure, further including a seat tilt actuator for changing an angle between the seat component and the base component.

According to some embodiments of the disclosure, further including a back-rest actuator for changing an angle between the back component and the seat component.

According to some embodiments of the disclosure, further including a leg-rest component, connected to the seat component by a leg-rest hinge.

According to some embodiments of the disclosure, further including a leg-rest actuator for changing an angle between the leg-rest component and the seat component.

According to some embodiments of the disclosure, further including a footboard component connected to the leg-rest component.

According to some embodiments of the disclosure, the footboard is designed to move toward and away-from feet of a user sitting in the chair.

According to some embodiments of the disclosure, further including a footboard actuator for moving the footboard component toward and away-from feet of a user sitting in the chair.

According to some embodiments of the disclosure, further including a contact sensor contact of the contact sensor with an object.

According to some embodiments of the disclosure, further including a controller for controlling at least one actuator.

According to some embodiments of the disclosure, further including a processor for programming the controller.

According to some embodiments of the disclosure, at least one of the actuators is an electric actuator. According to some embodiments of the disclosure, at least one of the actuators is a hydraulic actuator.

According to some embodiments of the disclosure, further including an arm-rest component.

According to some embodiments of the disclosure, the arm-rest component is configured to change angle relative to the seat component according to a change of angle between the back-rest and the seat.

According to some embodiments of the disclosure, further including a handle component attached to the arm-rest component.

According to some embodiments of the disclosure, the handle component is configured to change angle relative to the arm-rest component when the back-rest changes angle relative to the seat.

According to some embodiments of the disclosure, the handle component is configured to change angle relative to the seat when the back-rest changes angle relative to the seat.

According to some embodiments of the disclosure, further including an inflatable sleeve for supporting a user. According to some embodiments of the disclosure, further including an air compressor for inflating the inflatable sleeve.

According to some embodiments of the disclosure, the chair is configured to automatically inflate and deflate the inflatable sleeve.

According to some embodiments of the disclosure, further including a pressure sensor for measuring pressure in the inflatable sleeve.

According to some embodiments of the disclosure, further including a tablet for controlling the chair.

According to some embodiments of the disclosure, the controlling the chair is designed to be performed by a method selected from a group consisting of activating a touch-screen control, pressing a button, voice recognition, detecting eye movement, and detecting gaze direction.

According to some embodiments of the disclosure, the tablet includes a camera, and the tablet is further configured to perform at least one action selected from a group consisting of producing an image of a user in the chair, producing a video of a user in the chair, and analyzing user position in the chair.

According to some embodiments of the disclosure, further including components for providing a massage action.

According to an aspect of some embodiments of the present disclosure there is provided a method for assisting a user to stand up from a chair, the method including providing a chair, the chair including a base component, a seat component connected to the base component by a central hinge such that when the chair is in a sitting position, the seat component is lower than the central hinge, a leg-rest component, connected to the seat component by a leg-rest hinge, and a back-rest component connected to the seat component by a back hinge, changing an angle of the leg-rest component relative to the seat component to make the leg-rest component substantially parallel to the seat component, enabling a user's leg to be approximately straight, and using chair components to raise the user to a substantially standing position, thereby assisting the user to stand up.

According to some embodiments of the disclosure, using chair components to raise the user to a substantially standing position includes using the seat component to raise the user to a substantially standing position.

According to some embodiments of the disclosure, using chair components to raise the user to a substantially standing position includes using the back-rest component to raise the user to a substantially standing position.

According to some embodiments of the disclosure, using chair components to raise the user to a substantially standing position includes using the back-rest component and the seat component to raise the user to a substantially standing position.

According to some embodiments of the disclosure, using chair components to raise the user to a substantially standing position includes using the leg-rest component to raise the user to a substantially standing position.

According to some embodiments of the disclosure, the chair includes a footboard component, and the footboard is brought to touch the user's feet before lifting the user to the standing position.

According to some embodiments of the disclosure, when the user is tilted to a standing position, the footboard moves towards the floor and substantially touches the floor.

According to some embodiments of the disclosure, further providing at least one handle positioned for the user to grasp while being assisted to stand up to prevent the user from falling forward.

According to some embodiments of the disclosure, further providing at least one arm-rest positioned approximately parallel to the floor for the user to rest the user's arm while being assisted to stand up, to at least partially support the user's weight.

According to some embodiments of the disclosure, movement of the chair is controlled by a tablet.

According to some embodiments of the disclosure, a rate of assisting the user to stand up from the chair is automatically changed based on an elapsed time programmed in the tablet.

According to an aspect of some embodiments of the present disclosure there is provided a method for assisting a user to stand up from a chair, the method including providing a chair, the chair including a base component, a seat component connected to the base component by a central hinge such that when the chair is in a sitting position, the seat component is lower than the central hinge, a back-rest component connected to the seat component by a back hinge, and a footboard component, bringing the footboard to touch the user's feet before lifting the user to the standing position, and using chair components to raise and tilt the user to a substantially standing position, thereby assisting the user to stand up.

According to some embodiments of the disclosure, using chair components to raise the user to a substantially standing position includes using the seat component to raise the user to a substantially standing position.

According to some embodiments of the disclosure, using chair components to raise the user to a substantially standing position includes using the back-rest component to raise the user to a substantially standing position.

According to some embodiments of the disclosure, using chair components to raise the user to a substantially standing position includes using the back-rest component and the seat component to raise the user to a substantially standing position.

According to some embodiments of the disclosure, using chair components to raise the user to a substantially standing position includes using the leg-rest component to raise the user to a substantially standing position.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present disclosure may be embodied as a system, method or computer program product. Accordingly, some embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present disclosure may take the form of a computer program product embodied in one or more computer readable medium(s) having computer readable program code embodied thereon. Implementation of the method and/or system of some embodiments of the disclosure can involve performing and/or completing selected tasks manually, automatically, or a combination thereof. Moreover, according to actual instrumentation and equipment of some embodiments of the method and/or system of the disclosure, several selected tasks could be implemented by hardware, by software or by firmware and/or by a combination thereof, e.g., using an operating system.

For example, hardware for performing selected tasks according to some embodiments of the disclosure could be implemented as a chip or a circuit. As software, selected tasks according to some embodiments of the disclosure could be implemented as a plurality of software instructions being executed by a computer using any suitable operating system. In an exemplary embodiment of the disclosure, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present disclosure may be described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as controlling the chair, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWING(S)

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

DESCRIPTION OF SPECIFIC EMBODIMENTS

Figure 1:
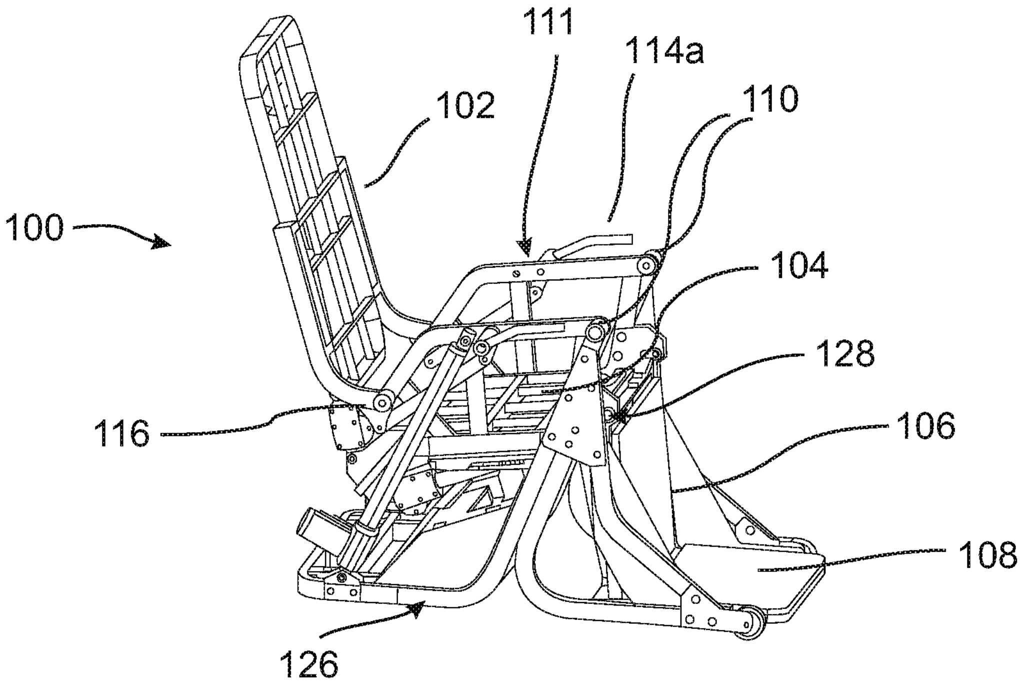
FIGS. 1-2 are simplified illustrations of example embodiments of a chair in accordance with the disclosure.

The present disclosure, in some embodiments thereof, relates to a chair for assisting a user to stand or reach a vertical position, and, more particularly, but not exclusively, to a tilting or lifting chair capable of reaching any position and/or angle between sitting, lying flat, at a negative angle (Trendelenburg), and tilted at any angle up to fully vertical (standing).

Introduction

The present disclosure, in some embodiments thereof, relates to a lifting and/or tilting chair which can lift and/or tilt people to a fully standing position.

In some embodiments, the chair includes technically innovative movements, providing potential medical benefits.

An aspect of some embodiments includes the chair assisting a user to stand up from other positions such as sitting, lying down, and other positions. Existing devices for lifting a user from a chair typically lift the user's seat up, but the user needs to perform a final shift of weight from having his/her weight on the seat to placing his/her weight on the feet, causing a sudden increase from a small weight to full weight on the knees or feet.

In some embodiment the chair straightens the user's legs relative to the user's thighs, allowing the user to lock his/her knees before transferring weight to the knees or feet. Such a locking of knees is not provided by existing devices.

In some embodiments the chair transfers the user's weight to the user's feet gradually. Such a gradual transfer of weight is not provided by existing devices, which typically require a last action of transferring weight from the chair to standing.

In some embodiments the user is assisted to stand up starting from a normal sitting height.

An aspect of some embodiments includes the chair having a relatively small footprint on the floor, despite supporting a user in all the various positions listed herein, such as a seat, a recliner, a flat rest, angles in between, and when lifting the user to a standing position.

In some embodiments the chair is sized and/or designed to fit in a home, optionally taking up a footprint on the floor approximately equal to a footprint of a typical armchair.

In some embodiments the chair is sized and/or designed so that a volume swept by the chair, when moving between a sitting position and a standing position, fits within the volume of space directly above the chair when the chair is in the sitting position.

In some embodiments a height of the seat of the chair, at least when the chair is in a sitting position, is equivalent to a height of a standard armchair.

In some embodiments a height of the seat of the chair, at least when the chair is in a sitting position, is equivalent to a height of a standard dining chair.

An aspect of some embodiments includes providing handles instead of or in addition to arm-rests. Existing assistive arm chairs which have only arm-rests typically raise a user to a standing position, while the arm-rests gradually tilt with the seat, and "pour" a user out of the arm chair. Furthermore, arm-rests of existing assistive arm chairs typically present a padded flat surface, which supports the arms while sitting, but are difficult to hold on to. In some embodiments, the chair provides handles which a user can grab while being assisted to stand, so that the user can decide when let go of the handles and step away from the chair. For example, the user has the handles to hold on to while straightening and/or locking his/her knees. The handles are optionally not necessarily at the same angle, relative to the seat, as the arm-rests. In some embodiments, the handles are optionally presented/controlled to provide physical support, and the arm-rests are optionally presented/controlled to provide conventional padded support while sitting/lying down.

An aspect of some embodiments includes specific placement of hinges between chair components.

For example, hinges between a back-rest and a seat, so the chair can serve as a seat, as a flat rest, and all angles in between.

For example, hinges between leg-rests and the seat, so the chair can serve as a seat, as a flat rest, and all angles in between.

For example, hinges between armrests and a base of the chair, so the armrests can support a user's arms when serving as a seat, when serving as a flat rest, and when lifting the user to a standing position.

For example, hinges between footboards and leg-rests, so the chair can serve as a seat, as a flat rest, and all angles in between, and can support a user's feet when lifting the user to a standing position.

In some embodiments, a central hinge for tilting the chair is placed higher than a seat of the chair. In a typical medical bed, even a bed which has hinges between bed portions and hinges for tilting the bed, the hinges are lower or on the same level of a bed mattress support surface or frame, which limits the angle of tilt of the bed. In some embodiments of the present disclosure, the central hinge is located within or below arm-rests of the chair, and above a seat of the chair.

An aspect of some embodiments includes specific placement of electrically controlled and/or activated actuators which push and/or pull components of the chair, so as to change angles between the components, so the chair can serve as a seat, as a flat rest, and all angles in between, and can support lifting the user to a standing position and/or lowering a standing user into the chair in all its positions.

An aspect of some embodiments, the chair includes computerized control.

In some embodiments the chair includes a user-interface to a chair controller, whereby the user can control positions of the chair, transitions between positions of the chair, lifting the user to a standing position, lowering the user from a standing position, activating sleeves to retain the user from falling away from the chair, and so on.

In some embodiments the controller may optionally receive remote control commands over a communication link.

Overview—Continued

In some embodiments, the chair can potentially function as an arm-chair and/or a recliner, able to tilt a user from a seating or lying position to a standing position, optionally including all in-between positions.

In some embodiments, the chair optionally includes a computerized control, for example such as a tablet to control the chair's position. In some embodiments, the chair includes connectivity to, for example, a smart home, a phone, an emergency remote connection, a hospital, a physician, a caretaker, a smart television and various communicating computers and/or communication devices.

The term "tablet" is used herein to include various computing devices providing a user interface and electronic communication capability, such as, by way of some non-limiting examples, a tablet, a smart-phone, a voice-actuated computing device (e.g. Echo by Amazon, Google Home by Google) and so on.

Present day chairs intended for lifting typically lift a user to a dangerous position, in which the user may potentially slide, fall, lose balance and get injured.

In some embodiments, the chair described herein relates to a Smart Tilt Chair concept (STC).

An object of some embodiments of this disclosure is to provide a chair which allows a user to lift himself from seating, lying or other position, to a full standing position, allowing him to walk from the chair. The chair is able to keep the user in a straight position over a footprint of the chair on the floor, that is, a support base of the chair, and optionally in any angle between approximately minus fifteen (−15) degrees to approximately plus ninety (90) degrees relative to horizontal, which potentially provides medical advantages. Sedentary behavior, such as sitting, is associated with a variety of biopsychosocial outcomes in older adults. Clinically, sedentary lifestyle contributes to markers of poor plasma lipids, glucose and insulin levels, suppressed skeletal muscle lipoprotein lipase and increased biomarkers associated with obesity, diabetes, and cardiovascular disease. Emerging evidence suggests that time spent sedentary also interacts with mental health.

Some existing Lift Chairs in the market may be dangerous and can allow a user to fall. One in five falls causes a serious injury such as a broken bone, morbidity, reduced functionality or head injury. Fear of falling can also seriously affect an aging adult's quality of life and sadly, can keep a person from being active and thriving.

In some embodiments, the chair includes a movable footboard, optionally a motorized movable footboard, which can move in and out of its central position, in one direction to extend leg space, and in the other direction to move towards the user's feet, optionally to touch the feet before tilting so the user will not slide while tilting.

In some embodiments, the footboard optionally changes its position during a tilt movement, so that at an end of the tilt the footboard touches the floor, potentially allowing the user to step out of the chair with minimal step-down.

In some embodiments, the chair is optionally designed with a central hinge or central pivot configured so that when the chair is tilted, the seat support tilts and also rises, which potentially provides space for a full tilt while keeping the seat support surface at a height for support a user's seat. In some embodiments the central pivot is optionally implemented by a track or tracks and a pin or pins sliding in the track. In some embodiments the track(s) are configured in the base component and the pin(s) are attached to the moving chair components. In some embodiments the track (s) are attached to the moving chair components and the pin(s) are attached to the base component.

In some embodiments, the chair optionally includes one or two arm rests which optionally change their position according to the angle of the back-rest, to enable comfortable and safe use by the user.

In some embodiments, the chair optionally includes one or two handles which optionally change their position according to the angle of the back-rest, to enable a user to grab the handle for support. In some embodiments the handles include one or more control buttons for controlling the chair positions or movement.

In various embodiments, the chair may include one or more or even all of the following features:

1. Has a footboard which is movable by an actuator, the footboard movable towards and away from the head of the chair. The footboard may optionally move into and out of a leg-rest.
2. The footboard optionally enables a user to move the footboard towards the user's feet until the footboard touches the feet, so the footboard supports the user while the user moves to a standing position, potentially preventing the user from sliding.
3. The footboard may optionally be moved by user command and/or by predefined program commands according to the chair position.
4. The footboard may extend out, in order to give more space when a leg-rest is raised, in order to prevent pressure on the user feet.
5. The footboard may move in a direction of a user's head, potentially making contact with and/or even pushing on the user's feet, or move in the opposite direction. The footboard movement may optionally be used in providing physical therapy to the user.
6. The footboard may have a sensor for sending a signal when the footboard is pressed by the user.
7. The footboard may include a scale.
8. The footboard may have a sensor on its outer side for alerting and/or for preventing the footboard from pressing on an object or a person.
9. The chair optionally include armrests, and in some embodiments the armrest optionally includes one or more handles to control some functions of the chair by a user, optionally also providing a safe grip.
   In some embodiments, the handle may have a control button to electrically operate the chair to move the chair at least to one or more positions, such as standing, lying, and seating.
10. On an arm rest there may be an additional operating button in a location, which will allow the user to reach it, while in lying position or some other position in the chair, so the user is always able to reach an operating button.
11. The arm rests may be caused to change their position based on an angle of a back-rest of the chair relative to ground or relative to the arm rests. In some embodiments the angle which causes the arm rests to change their position is optionally predefined and can be changed, for the comfort of the user. As the angle of the relevant support surface changes the arm rest angle is caused to change. In some embodiments the angle is optionally changed using an actuator controlled by a program or by a mechanical structure causing the change of the armrest angle in respect to the back-rest or one of the other support surface angles.
12. The chair movement is optionally controlled by a controller having a program which may be changed remotely via connectivity of the controller.
13. For supporting the user when moving to tilting position there may be air sleeves from the sides of an upper part of the chair, which can be inflated and deflated, optionally automatically, optionally by the controller, for supporting the user not to fall when tilted.
14. In some embodiments such sleeves may be attached to the chair in a region of the user's lower extremities.
15. The sleeves may include sensors to control the pressure on the user body.
16. A sensor may be placed in any area of the chair for detecting use of the chair.

17. The chair may be upholstered (e.g., in areas of contact with the user's body and/or on an outside of the chair) and/or appear and/or function similarly to an arm chair or a recliner, for example, in a living room or a bedroom setting.
18. When in a seated state, the chair optionally has a footprint smaller than 1.2 meter by 1.2 meter. For example, the chair width may be 40 cm, 60 cm, 80 cm, 100 cm or smaller or intermediate or greater sizes. For example, the chair depth may be 40 cm, 60 cm, 80 cm, 100 cm or smaller or intermediate or greater sizes.
19. The chair may include a tablet, optionally connected to a controller of the chair through one or more of:
    - Wi-Fi;
    - Infra-Red;
    - Wired;
    - Bluetooth; and
    - Some other connectivity.

Possible Operating Systems for the Tablet

In various embodiments the tablet may use any of:

- IOS operating system such as used for Apple and Mac systems;
- Android operating system;
- Windows operating system;
- Linux operating system; and
- some other operating system.

Tablet Capabilities and Functionality

In some embodiments the tablet is optionally included as a part of the chair and is able to operate the chair, and can also be used for various available tablet operations such as:

- operate as a phone for the user;
- control electronic devices such as Smart Home devices;
- operate tablet applications, such as emergency call, medicine reminder and control, communication applications etc.;
- recording application(s); and
- Wi-Fi/Bluetooth/RF (Radio Frequency) wireless connectivity or other connectivity available in the tablet.

In some embodiments the tablet optionally includes a program, for example a program which stores settings for actuator operation according to pre-stored chair positions. The settings includes one or more of: extent of actuator movement, order of operating actuators, speed of actuator movement, which actuators move simultaneously with which, and so on.

In some embodiments the tablet optionally includes one or more forbidden volumes, that is, volumes in three-dimensional space as measured relative to the chair base, so the chair does not contact objects in the forbidden spaces.

In some embodiments the tablet optionally stores programs including: exercise programs which move the chair to exercise a user.

In some embodiments the tablet optionally controls a rate of moving chair components. In some embodiments the tablet optionally includes stores programs which optionally control a rate of moving chair components over time. By way of a non-limiting example a user who has just had surgery, for example, hip replacement or knee replacement, is optionally raised to a standing position slowly at first, and as the day following surgery pass, the rate at which the user is raised to a standing position is gradually made faster, as the user recuperates.

In some embodiments, the tablet may optionally include a camera. The camera may optionally be programmed to perform one or more of the following:

- the camera can send pictures of the user, optionally doing so in case the user is in a certain position. In some embodiments image analysis is used to determine whether a user is asleep; sitting straight, slouched or fallen; or determine some other problem with the user;
- can identify if the user is sitting in the chair. If the user is not sitting at a defined time, the tablet may optionally send a signal or call a pre-defined third party or system, giving an alert;
- can identify a bad position of the user (such as the user's head falling to the side or the front);
- can view and identify other important pre-defined characteristics of the user and in case the user current condition does not meet such pre-defined characteristics, the tablet may optionally notify a pre-defined third party/system, of such incident. By way of a non-limiting example, image analysis may optionally be used to determine whether a user is asleep; sitting straight, slouched or fallen; determine whether a user's face changes due to a stroke, whether a usually clean-shaven person is now un-shaven, or determine some other problem with the user;

In some embodiments, the tablet can optionally remind the user to take medication.

In some embodiments, the tablet can optionally remind the user to exercise.

1. In some embodiments, the chair may be operated by voice recognition, optionally using the tablet microphone and the tablet processing, or the hand-pendant, or sending data to a server and the server performing the processing.
2. In some embodiments, the tablet is optionally integrated in the chair, and may optionally be connected to a Vital Signs diagnostic processor, and optionally collect a user's vital signs. In some embodiments some or all of the vital signs are optionally collected using a non-contact sensor and/or a sensor built into the chair (e.g. a sensor built into a back-rest and optionally detecting breathing, a sensor built into an arm-rest and optionally measuring pulse or blood oxygen saturation or blood pressure, a sensor built into a leg-rest or a footboard measuring blood pressure). In some embodiments analyzing data from the sensor(s) is optionally used to determine when to change a user's position. By way of a non-limiting example, detecting edema in the feet is optionally used to initiate a position change of the chair and/or massage and/or physical therapy. In some embodiments, the tablet can optionally send information to one or more predefined contacts in case the vital signs do not fall within a specific range.
3. In some embodiments, the tablet optionally collects, and optionally stores in a memory, some or all of the chair positions, optionally including a time when these the chair was in these positions, which may be used in order to give the history of the chair use. The chair positions may be defined by hinge angles, by actuator extension lengths, or by specified names, such as horizontal, vertical sitting, vertical standing, X-degrees reclining, and so on.
4. In some embodiments, the chair is optionally provided in various sizes to allow smaller and bigger people.
5. In some embodiments, the chair optionally includes powered locomotion for example powering floor contacting wheels, for moving the chair, with and/or without the user thereon.
6. In some embodiments, the chair may have armrests and/or handles connected to the side of the back-rest or to the seat. In some designs the armrests and/or handles are not fixed and in some embodiments include a mechanism for changing an angle of the armrests in respect to the back-rest, optionally according to the angle between the back-rest and the seat support or according to the angle of the seat support in respect to the floor, or a combination of the two. It is potentially beneficial to a user to have different angles of the handles/armrest support, based on different angles of chair components relative to each other and/or relative to the floor.

7. In some embodiments, the chair optionally includes one or more inflatable sleeves for preventing the user from falling out of the chair and for supporting the user in a standing position. In some embodiments, the sleeves are connected to an air compressor and are controlled so that the user is able to activate and deactivate. In some embodiments, the sleeves may also optionally include a controlled auto function to inflate and deflate according to a predefined program, for example automatically inflating to support a user when the chair lifts the user to a standing position and/or automatically deflating when the chair reaches a horizontal and flat position. The location of such inflatable sleeves can be anywhere along the chair, from chest area to the legs and feet.
8. In some embodiments, the chair includes a massage function. In some embodiments, the massage function optionally includes an inflatable part on the back side of user, to prevent the user from feeling the massage component when not in use. In some embodiments, the inflatable part is optionally inflated when massage function is not in use and deflated when massage action is in use.
9. In some embodiments, the chair is optionally provided as a kit including components for assembly, for ease in transportation and/or packaging, and/or providing as several packages each of lower weight/bulk than the complete chair.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The features described herein are to be considered optional, as not all features listed herein need be provided in an exemplary chair.

Figure 2:
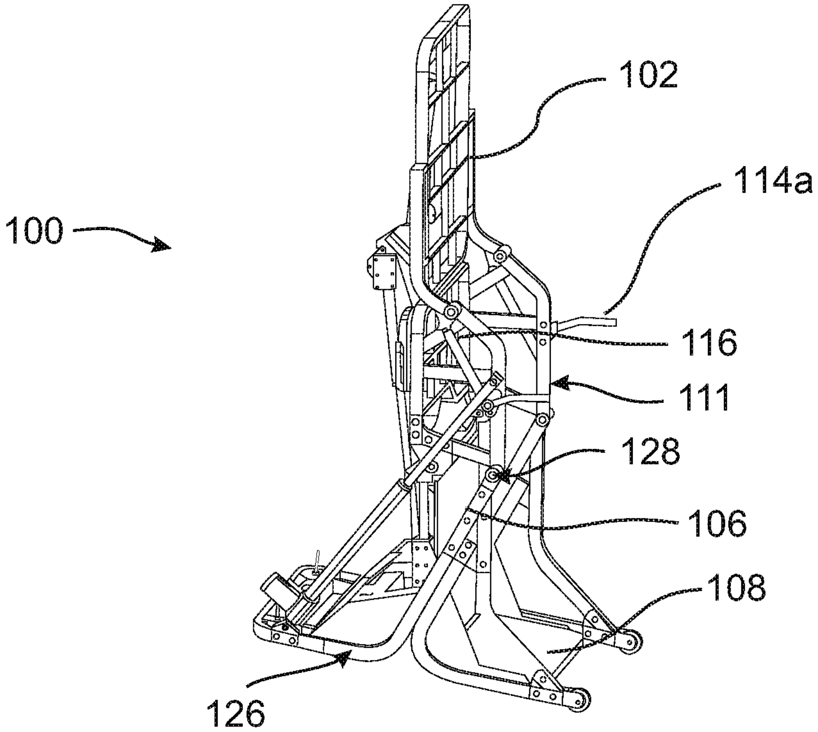

Reference is now made to FIGS. 1-2, which are simplified illustrations of example embodiments of a chair in accordance with the disclosure.

Figure 3:
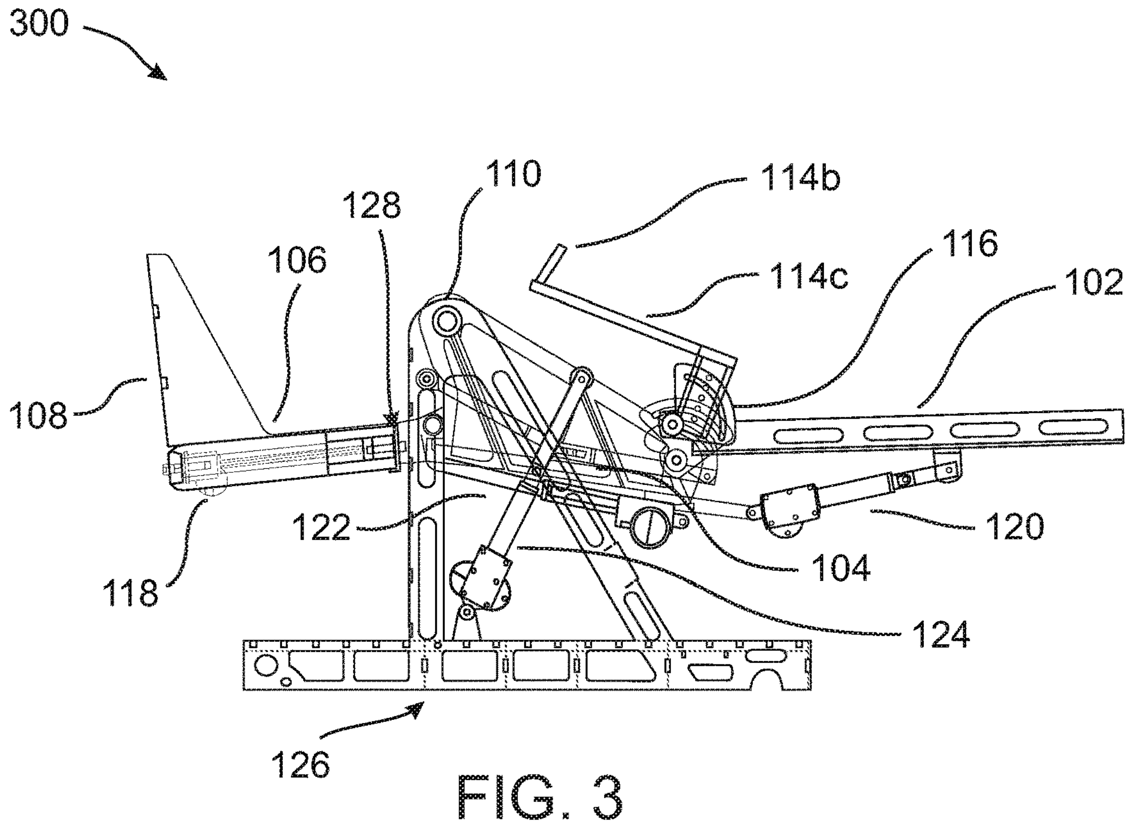
FIGS. 3-4 are simplified illustrations of example embodiments of a chair in accordance with the disclosure.
Figure 4:
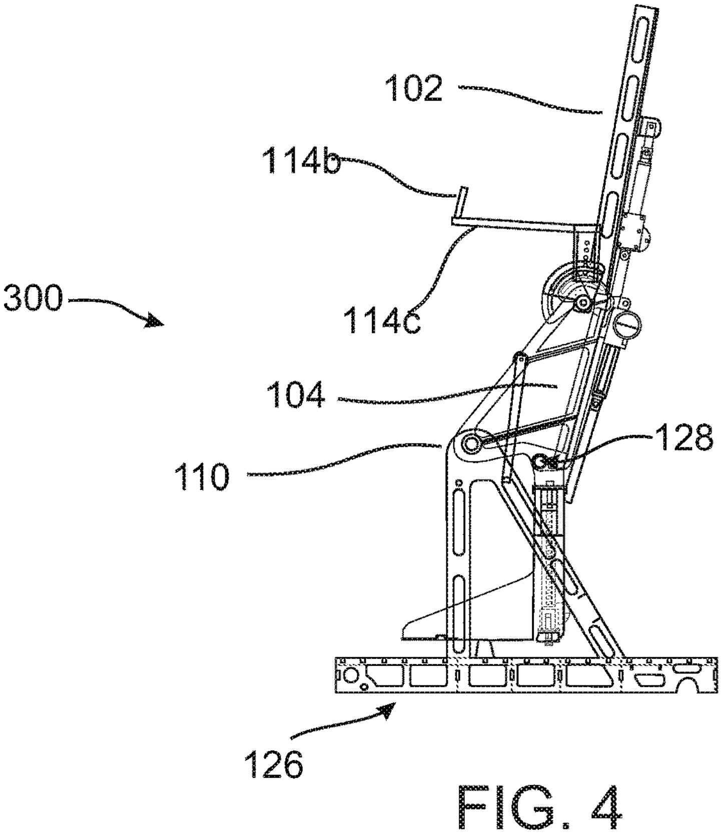

Reference is now additionally made to FIGS. 3-4, which are simplified illustrations of example embodiments of a chair in accordance with the disclosure.

FIG. 1 shows a chair 100 in a sitting position; FIG. 2 shows the chair 100 of FIG. 1 in a standing position; FIG. 3 shows a chair 300 in a horizontal position; and FIG. 4 shows the chair 300 of FIG. 3 in a standing position.

FIG. 1 shows a view from the right side of the chair 100 in a sitting position, with a plane of a seat 104 reclined to an angle of approximately (−7) degrees relative to the floor, or relative to horizontal.

The chair 100 optionally includes one or more hinges 110 116 128. In some embodiments, a back hinge 116 connects a back rest 102 to the seat 104. In some embodiments, a central hinge 110 connects the back-rest 102 or the arm-rest 111 to a base 126. In some embodiments, a leg-rest hinge 128 connects the leg-rest 106 to the seat 104.

In some embodiments, the leg-rest 106 is connected to a footboard 108.

In some embodiments, the footboard 108 is optionally connected to a footboard actuator 118 for acting upon the footboard 108 to move toward the feet (head side) of a user/patient and to the opposite direction. In some embodiments, the footboard actuator 118 is an electric actuator. In some embodiments, the footboard actuator 118 is a hydraulic actuator.

Handles and Arm-Rests

Figure 5A:
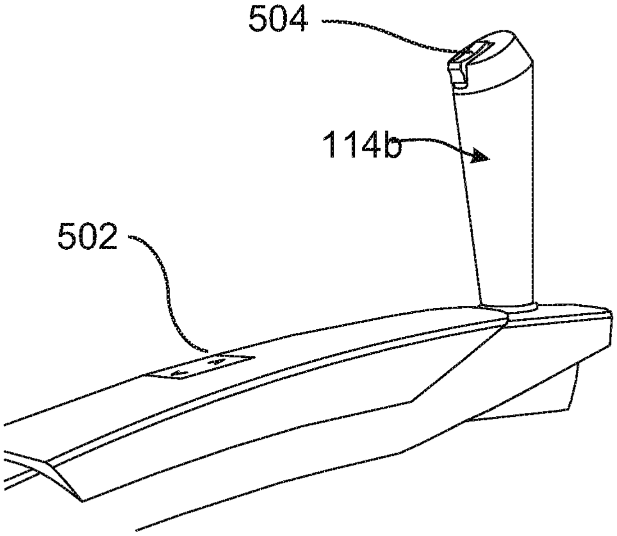
FIG. 5A is a simplified illustration of an armrest of a chair and chair control components in accordance with some embodiments of the disclosure.
Figure 6A:
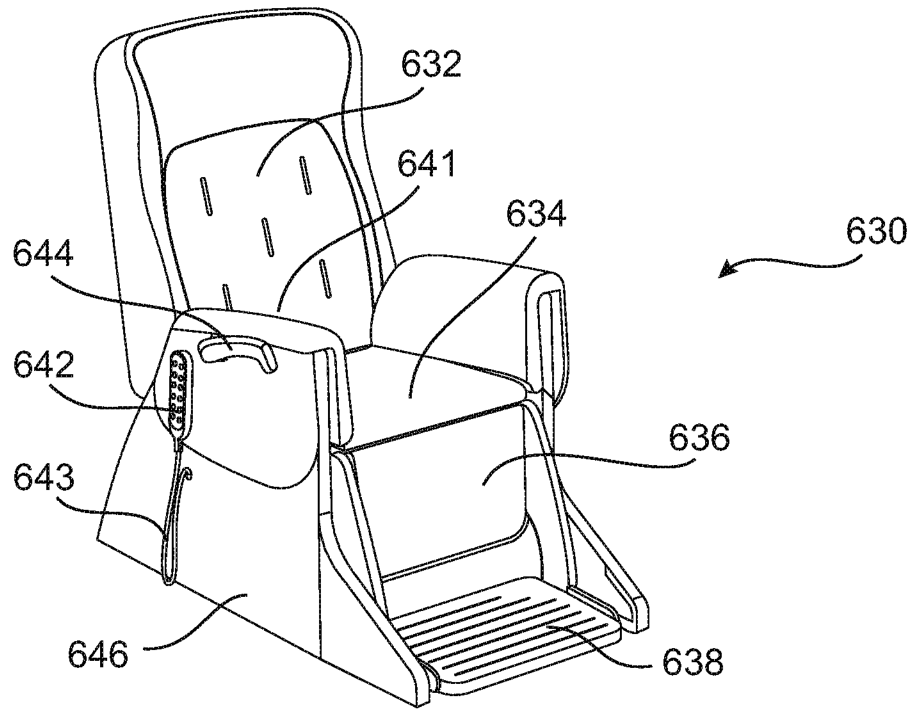
FIGS. 6A-6B are simplified illustrations of an example embodiment of a chair in accordance with the disclosure.
Figure 6B:
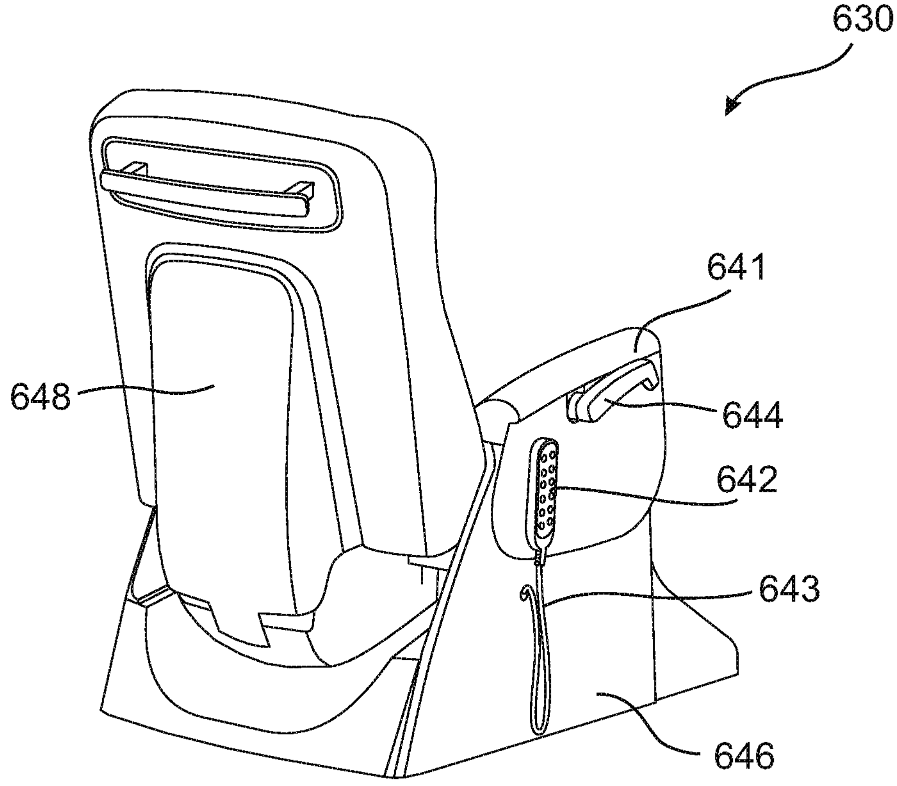

In some embodiments, the chair optionally includes both an arm-rest, such as the arm-rest 111 shown, for example, in FIGS. 1-4, 9 and 10, and a handle, such as the handles 114*a* shown, for example, in FIGS. 1 and 2, and the handles 114*b* shown in FIGS. 3, 4, 5A and 9, and the handle 644 shown in FIGS. 6A and 6B.

In some embodiments, the handles optionally include and extended handle 114*c* and a gripping handle 114*b*, for example see FIGS. 3, 4, 9 and 10.

In various embodiments there are specific linkages and/or actuators between the arm-rest 111 and the base 126, between the arm-rest 111 and the back-rest 102, or between the arm-rest 111 and the seat 104. The linkages and/or the actuators optionally act to position the arm-rest 111 at an angle suitable for each position and/or movement of the chair.

In various embodiments there are specific linkages and/or actuators between the handle 114*a* 114*b* and the arm-rest 111. The linkages and/or the actuators optionally act to position the handle 114*a* 114*b* at an angle suitable for each position and/or movement of the chair.

By way of some non-limiting examples:

FIG. 1 shows a sitting position, with the arm rest 111 approximately parallel to the floor, and the handle 114*a* approximately parallel to the arm-rest 111.

FIG. 2 shows a standing position, with the arm rest 111 pointing approximately toward the floor, and the handle 114*a* approximately parallel to the floor and approximately perpendicular to the arm-rest 111.

FIG. 3 shows a reclining position, with the arm rest 111 pointing up at an angle to the floor, and the handle 114*b* approximately perpendicular to the arm-rest 111.

FIG. 4 shows a standing position, different from the standing position shown by FIG. 2, with the arm rest 111 pointing approximately parallel to the floor, and the handle 114*b* approximately perpendicular to the arm-rest 111.

Wherever the term actuator is used herein, the term actuator is intended to refer to either an electric actuator or to a hydraulic actuator.

In some embodiments, the central hinge 110 is, when the chair 100 is in a sitting position, higher than a plane of the seat 104. The arrangement of the central hinge 110 enables the chair 100 to be low enough to function as a regular armchair. The arrangement of the central hinge 110 enables the seating support surface, which is connected to the leg-rest 106, to raise while tilting, providing enough height of the seat 104 from the floor to achieve full tilt as shown in FIGS. 2 and 4.

In some embodiments the chair 100 300 optionally includes two or more electric actuators. E.g. references 118 120 122 124 shown in FIG. 3, for moving the chair 100 300 to various positions, including a Seating/Reclining position as shown in FIG. 1, a Lying position as shown in FIG. 3, and a Standing position as shown in FIG. 2.

In some embodiments the actuators are optionally connected to a controller which can be pre-programmed to define and synchronize the movement of the different components of the chair.

FIG. 2 shows a view from the right side of the chair 100 in a fully tilted position, approximately flat at a plane close to 90 degrees to the floor, and having the footboard 108 almost touching the floor, or even touching the floor.

FIG. 3 shows a view from the right side of the chair 300 approximately flat at an approximately horizontal position relative to the floor.

FIG. 3 shows the chair 300 in a horizontal position, having the leg-rest 106 raised to approximately the level of the seat 104, being almost parallel to the back-rest 102, and the arm-rest 111 changing its position respectively. The leg-rest 106, the seat 104, and the back-rest 102, and the arm-rest 111, can optionally be all in a straight line, optionally flat, horizontal to the floor, or at other angles relative to the follow, both positive angles and negative angles, up to approximately −15 degrees relative to the floor.

FIG. 4 shows the chair 100 in an almost vertical position. The arm-rest 111 is shown approximately parallel to the floor, and approximately perpendicular to the seat 104 and the back-rest 102.

Reference is now made to FIG. 5A, which is a simplified illustration of an armrest of a chair and chair control components in accordance with some embodiments of the disclosure.

FIG. 5A shows an example of an arm-rest 111 of the chair, showing an optional control button 502 on the arm-rest 111 and an optional control button 504 on top of an optional support handle 114*b*. In some embodiments, one or both of the control buttons 502 504 may be used for operation of the chair 100.

Figure 5B:
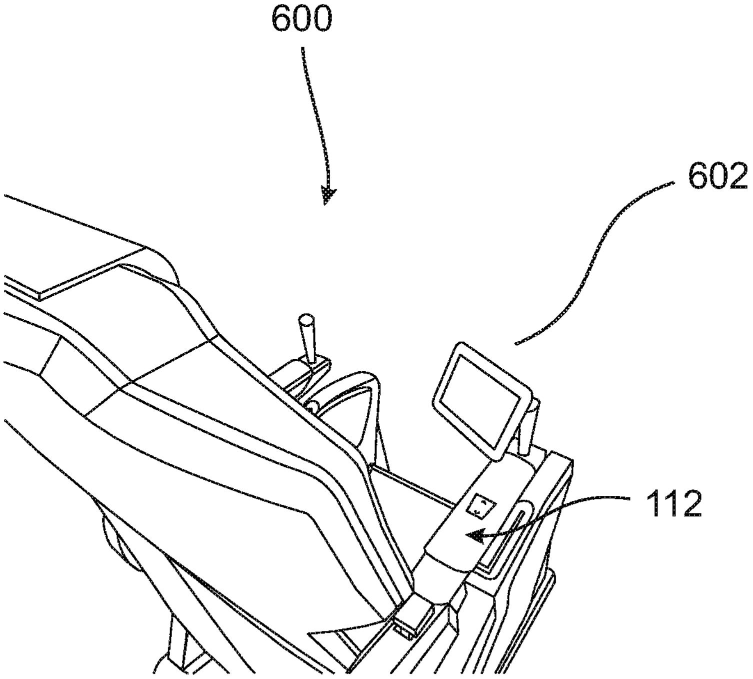
FIG. 5B is a simplified illustration of a chair and a tablet attached thereto in accordance with some embodiments of the disclosure.

Reference is now made to FIG. 5B, which is a simplified illustration of a chair and a tablet attached thereto in accordance with some embodiments of the disclosure.

FIG. 5B shows an optional attachment of a tablet 602 to a chair 600. In some embodiments, the tablet communicates with a controller or controllers which control actuators as described herein. In various embodiments the communication may include wireless communication by using one or more wireless communication functions included in a tablet, or wired communication, e.g. by a USB connection.

Reference is now made to FIGS. 6A-6B, which are simplified illustrations of an example embodiment of a chair in accordance with the disclosure.

FIGS. 6A and 6B show an embodiment of a chair 630 with a handle 644 attached to the chair 630 approximately at a middle of an arm-rest 641.

FIGS. 6A and 6B show an embodiment of the chair 630 with a control/interface unit 642 also termed a hand pendant 642. In some embodiments the hand pendant 642 is connected to a chair controller by a wire 643. In some embodiments the hand pendant 642 is optionally attached to the chair 630 by a magnet.

Additional components shown in FIGS. 6A and 6B include: a back-rest 632, a seat 634, a leg-rest 636 and a footboard 638.

FIGS. 6A and 6B show an embodiment of a chair including upholstery.

FIG. 6B shows an optional actuator cover 648.

Figure 7:
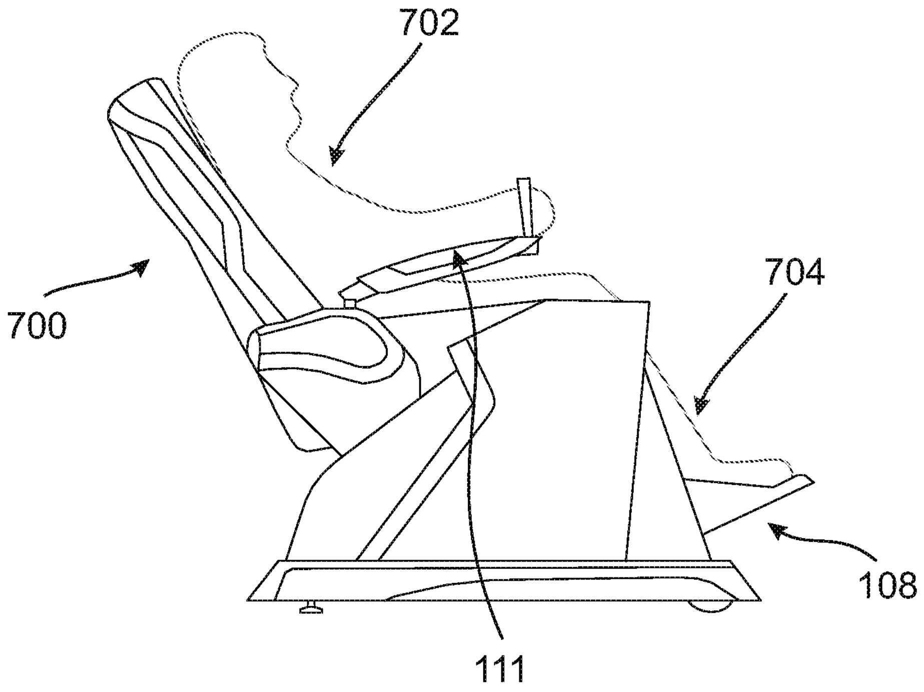
FIG. 7 is a simplified illustration of a chair in a reclining position in accordance with some embodiments of the disclosure.

Reference is now additionally made to FIG. 7, which is a simplified illustration of a chair in a reclining position in accordance with some embodiments of the disclosure;

FIG. 7 shows a chair 700 in a reclining position. FIG. 7 shows a footboard 108 raised so as to support feet 704 of a user 702.

FIG. 7 shows the chair in a reclining position, with a plane of the seat of the chair 700 at a negative angle relative to the floor.

Figure 8:
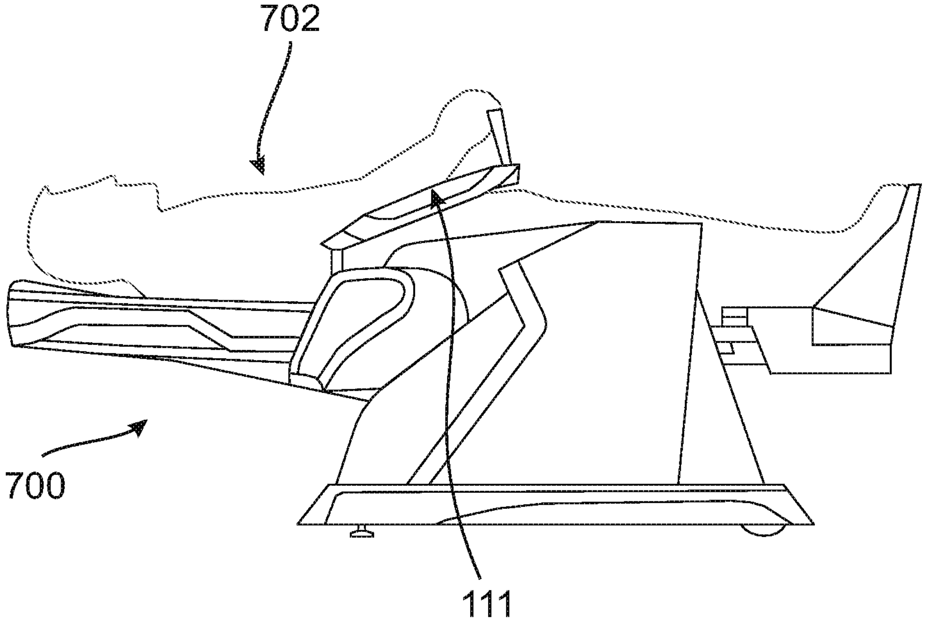
FIG. 8 is a simplified illustration of a chair in a horizontal position in accordance with some embodiments of the disclosure.

Reference is now additionally made to FIG. 8, which is a simplified illustration of a chair in a horizontal position in accordance with some embodiments of the disclosure.

FIG. 8 shows the chair 100 in an approximately horizontal position, with a user 702 lying on the chair 100. FIG. 8 shows the arm-rest 111 at an angle relative to the floor, to potentially help the user to use the arm-rest 111. FIG. 8 shows the arm-rest 111 at a different angle relative to the floor, or relative to the back-rest 102, or relative to additional components of the chair 100, than for example, the angle shown in FIG. 3.

FIG. 8 shows the chair in an approximately horizontal position, with a plane of the back, rest, the seat and the leg-rest of the chair 700 approximately parallel to the floor. It is noted that in positions similar to the shown in FIG. 8, the plane of the seat of the chair 700 may optionally be at a negative angle relative to the floor.

Figure 9:
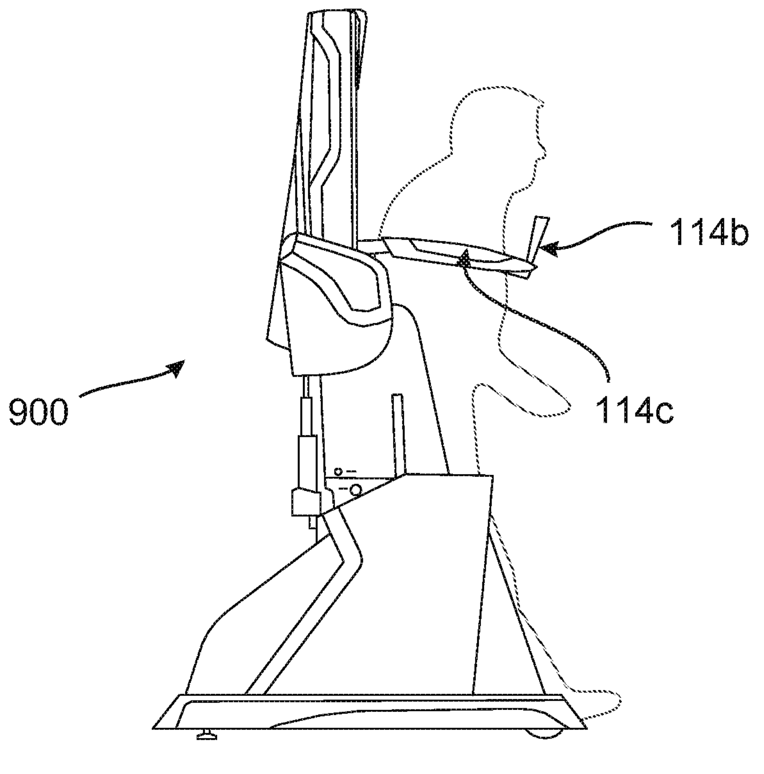
FIG. 9 is a simplified illustration of a chair in a standing position, showing a person stepping out of the chair in accordance with some embodiments of the disclosure.

Reference is now made to FIG. 9, which is a simplified illustration of a chair in a standing position, showing a person stepping out of the chair in accordance with some embodiments of the disclosure.

FIG. 9 shows a chair 900, showing how a person 902 can step out of the chair 100 while the chair 900 is in a vertical or almost vertical position.

In some embodiments the footboard (such as the footboard 108 shown in FIGS. 1, 2, 7) will touch or almost touch the floor, being parallel or almost parallel to the floor.

In some embodiment the chair 900 includes an arm-rest 111 which is connected to the chair 900 by a linkage (not shown) and/or by an actuator (for example, actuator 1002 in FIG. 10), which sets the arm-rest 111 approximately perpendicular to the back-rest, or approximately parallel to the floor, to support the user resting his arms on the arm-rest 111, optionally supporting the user's weight on the arm-rest 111.

In some embodiment the chair 900 includes a handle 114*b* connected to the chair 900 or to the arm-rest 111 by a linkage (not shown) and/or by an actuator (not shown), which sets the handle 114*b* approximately perpendicular to the arm-rest 111, or approximately perpendicular to the floor, to assist the user using his arms to prevent from falling forward.

Figure 10:
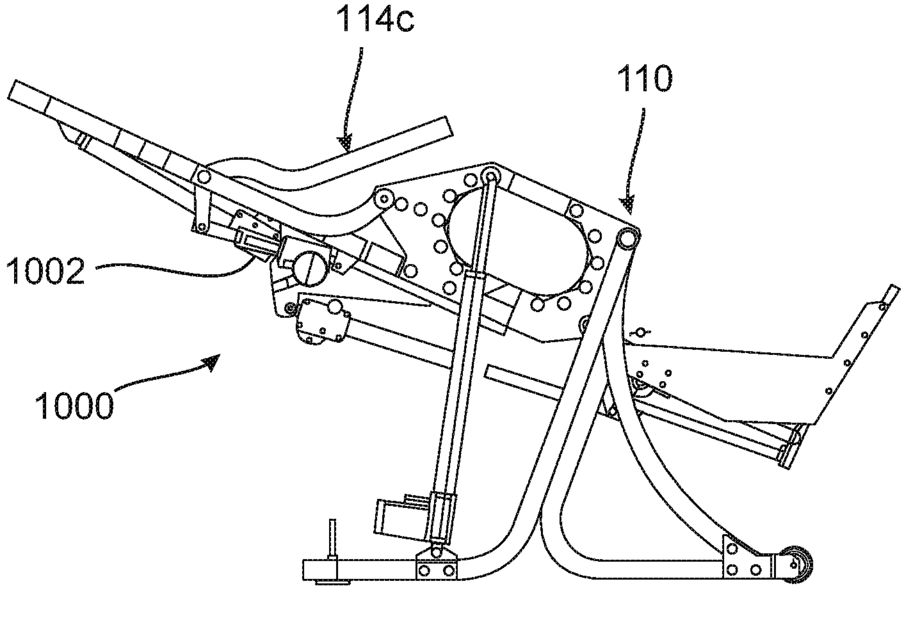
FIG. 10 is a simplified illustration of a chair in a tilted position in accordance with some embodiments of the disclosure.

Reference is now made to FIG. 10, which is a simplified illustration of a chair in a tilted position in accordance with some embodiments of the disclosure.

FIG. 10 shows a chair 1000 at an angle of approximately 40 degrees relative to the floor, showing an axis of the central hinge 110.

Figure 11:
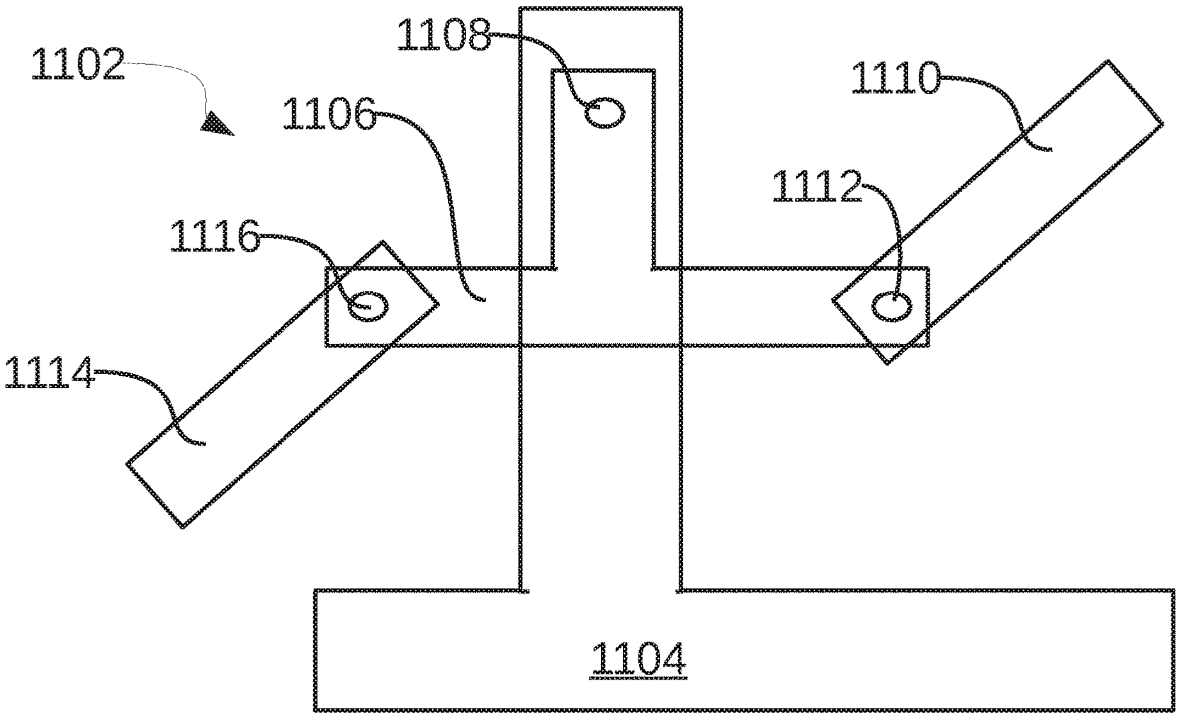
FIG. 11 is a simplified block diagram illustration of a chair in accordance with some embodiments of the disclosure.

Reference is now made to FIG. 11, which is a simplified block diagram illustration of a chair in accordance with some embodiments of the disclosure.

FIG. 11 shows a chair 1102 including: a base component 1104; a seat component 1106 connected to the base component 1104 by a central hinge 1108; a back-rest component 1110 connected to the seat component 1106 by a back hinge 1112; and a leg-rest component 1114, connected to the seat component 1106 by a leg-rest hinge 1116, In some embodiments, when the chair 1102 is in a sitting position, most or even all of the seat component 1106 is lower than the central hinge 1108.

In some embodiments, the central hinge 1108 is located so that when a user uses the chair 1102 to assist in standing, the user ends up standing at one edge of the base component 1104, ready to step away from the chair.

In some embodiments, when the user is brought to a standing position, the user is brought to a standing position with his feet outside the footprint of the base component 1104.

In some embodiments, the footprint of the base component on the floor is optionally U-shaped, or H-shaped, or shaped as two parallel lines, e.g. "||"-shaped, so that when a user is brought to a standing position, the feet of the user are optionally on the floor, between arms of the U-shaped base component.

Figure 12A:
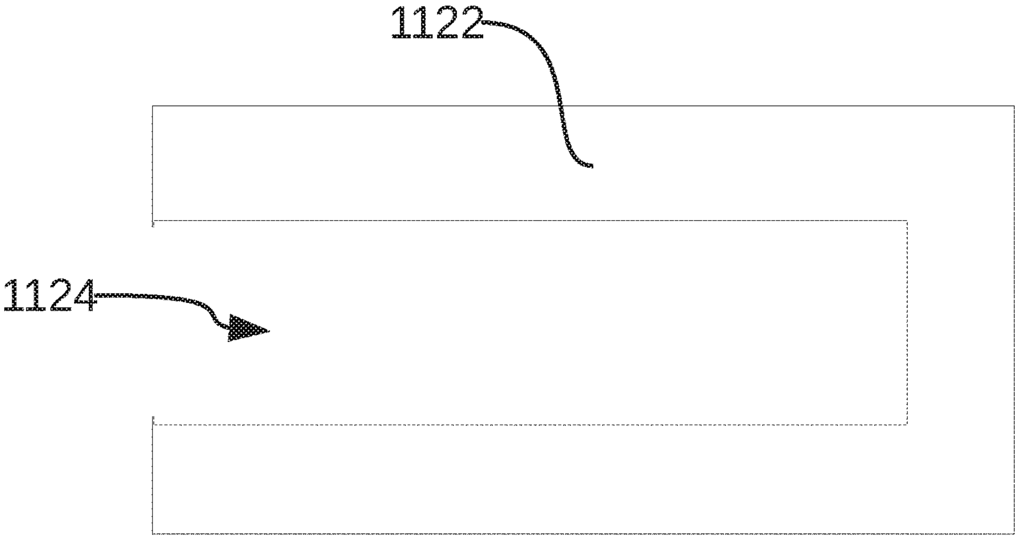
FIGS. 12A-12C are simplified block diagram illustrations of a foot print of a base component of a chair in accordance with some embodiments of the disclosure.
Figure 12B:
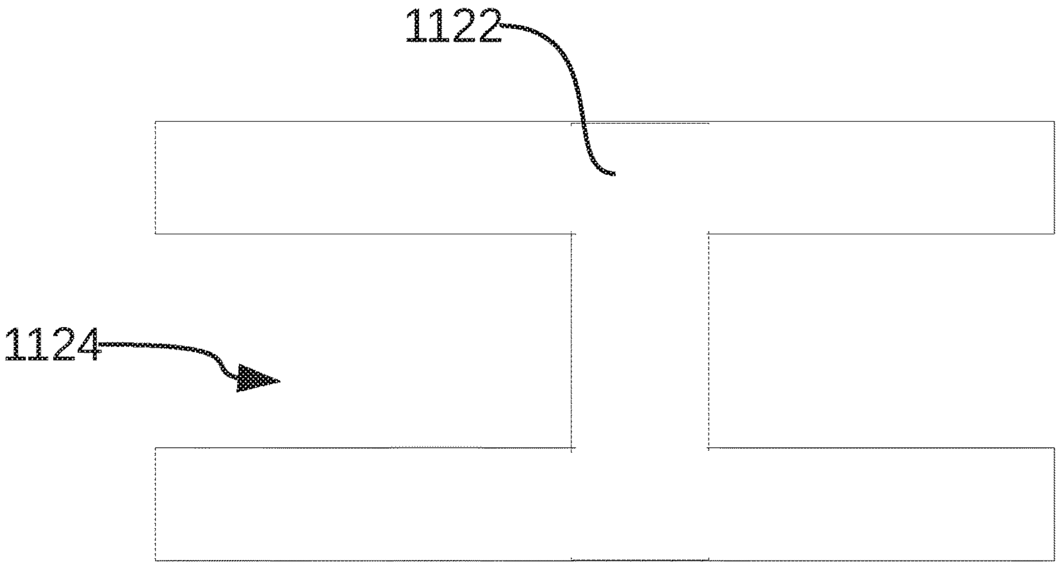
Figure 12C:
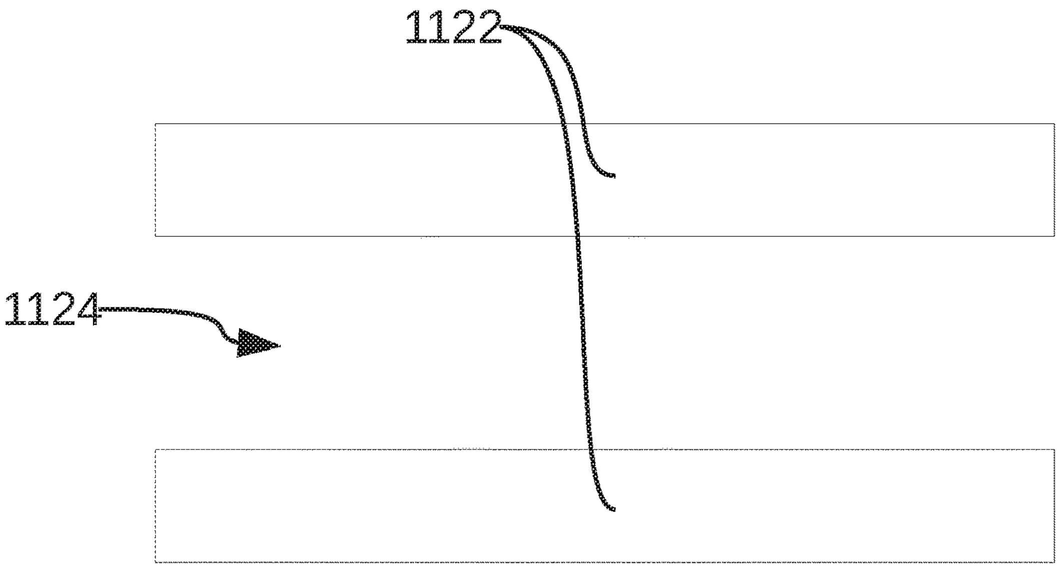

Reference is now made to FIGS. 12A-12C, which are simplified block diagram illustrations of a foot print of a base component of a chair in accordance with some embodiments of the disclosure.

FIGS. 12A-12C show a view from above of a footprint of a base component 1122*a* 1122*b* 1122*c*. The base components 112*a* 1122*b* 1122*c* shown by FIGS. 12A-12C respectively optionally include an indent 1124 or a central space 1124 for the footboard to come down to touch the floor.

Figure 13A:
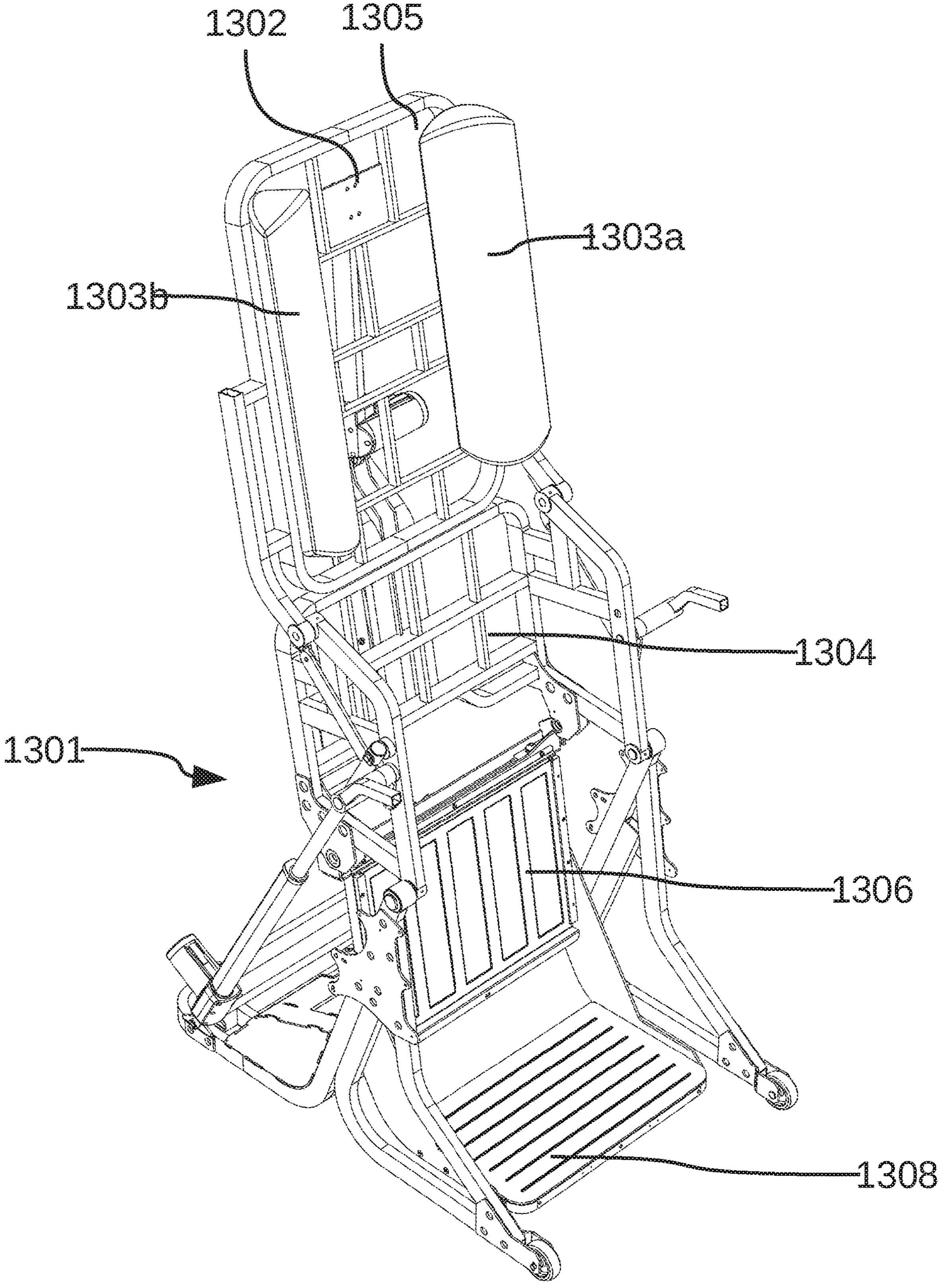
FIGS. 13A-13B are simplified illustrations of example embodiments of inflatable support components of a chair in accordance with the disclosure.
Figure 13B:
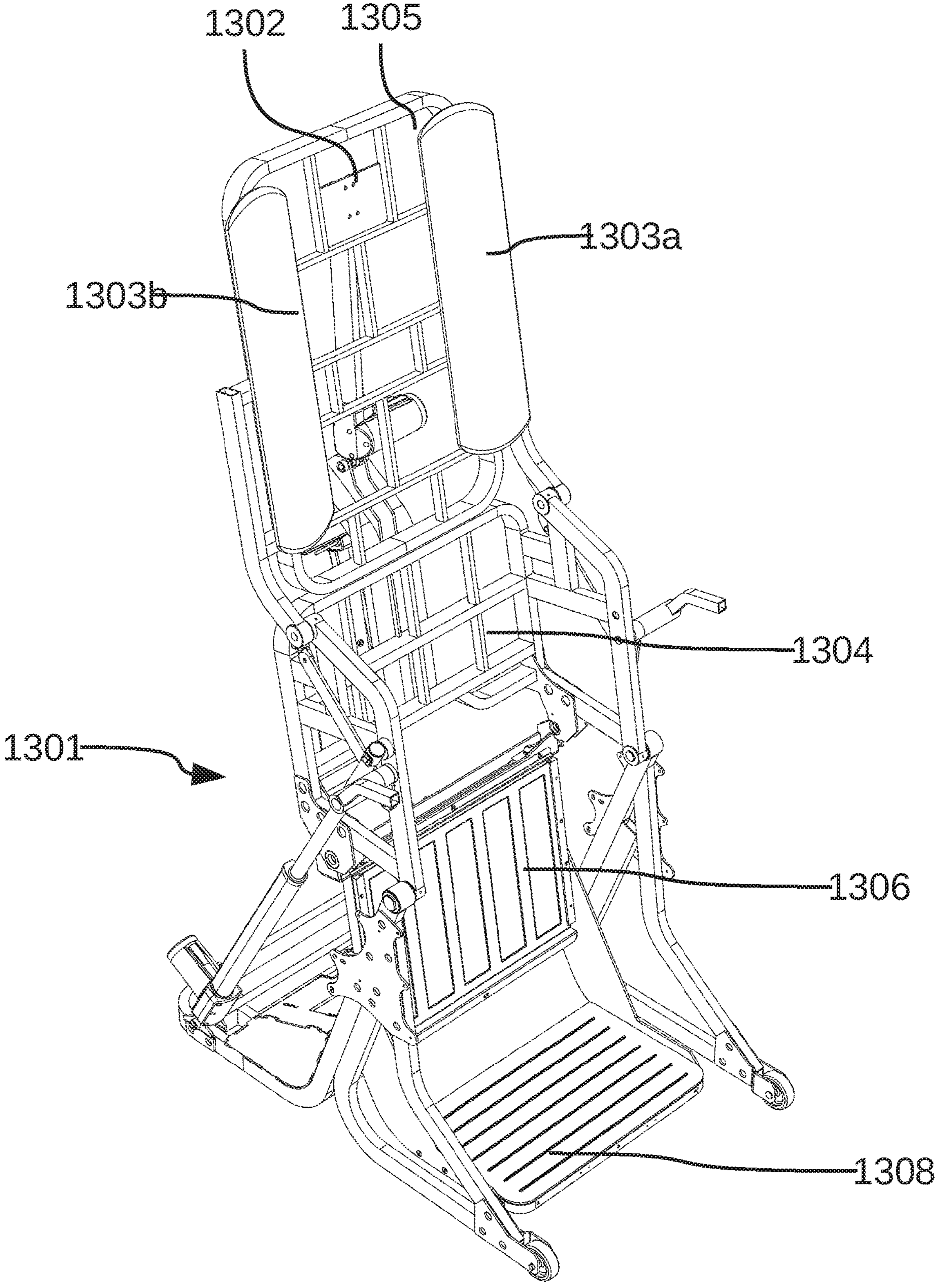

Reference is now made to FIGS. 13A-13B, which are simplified illustrations of example embodiments of inflatable support components of a chair in accordance with the disclosure.

FIGS. 13A and 13B shows a chair 1301 with inflatable torso or shoulder supports 1303*a* 1303*b*. FIG. 13A shows the inflatable torso or shoulder supports 1303*a* 1303*b* in an inflated state, and FIG. 13B shows the inflatable torso or shoulder supports 1303*a* 1303*b* in a not-inflated state.

The chair 1301 optionally includes a back-rest 1302, a seat 1304 and a footboard 1308. In some embodiments the chair 1301 optionally includes a leg-rest 1306.

In some embodiments a chair such as the chair 1301 may optionally include inflatable waist supports (not shown) such as the inflatable torso or shoulder supports 1303*a* 1303*b*. In some embodiments the optional waist supports may be attached to the seat 1304.

In some embodiments a chair such as the chair 1301 may optionally include inflatable leg supports (not shown) such as the inflatable torso or shoulder supports 1303*a* 1303*b*. In some embodiments the optional leg supports may be attached to the leg-rest 1306.

In some embodiments a chair such as the chair 1301 may optionally include inflatable foot supports (not shown) such as the inflatable torso or shoulder supports 1303*a* 1303*b*. In some embodiments the optional foot supports may be attached to the footboard 1308.

Some Examples of Possible Operation of the Chair a. From a sitting position to a standing position (FIG. 7 to FIG. 9) and from a sitting position to a lying position (FIG. 7 to FIG. 8). In some embodiments, a user presses a control button on an arm-rest (reference 502 in FIG. 5A) on a support handle (reference 114*b* in FIG. 5A) or on a tablet (reference 602 in FIG. 5B), or on a hand pendant connected to the chair controller (such as reference 642 in FIGS. 6A and 6B) providing a command to a controller to perform the following—Move back-rest down by closing back-rest actuator 120, Move leg-rest up and footboard out, by opening leg-rest actuator 122 and footboard actuator 118, Move footboard 108 in until the footboard 108 touches the user's feet by closing the footboard actuator 118, and tilt by opening a tilt actuator 124. While user is tilted the footboard supporting the user's feet optionally moves down, so that when fully tilted the footboard is optionally touching the floor, or in a closes position (see FIG. 2).
b. From a fully tilted or fully standing position to a sitting position (e.g. FIG. 9 or FIG. 4 to FIG. 7) or to a horizontal position (FIG. 8)—In some embodiments, a user presses a control button the footboard 108 optionally rises, by moving the footboard actuator 118, tilting down the chair by closing tilt actuator 124, raising the back-rest by opening the back-rest actuator 120, moving the leg-rest 106 down by closing the leg-rest actuator 122.

It is noted that in some embodiments, movements of any part of the chair, i.e. back-rest, leg-rest, footboard, and seat, can optionally be moved independently by moving an actuator which moves the respective part.

In some embodiments, the chair may have a support handle 114*a* 114*b* 644 connected to at least one of the arm-rests 111.

In some embodiments, the chair 100 may have an arm-rest 111 or arm-rests 111 which can optionally be connected to a side of the back-rest 102 or the arm-rest 111. In some embodiments, the arm-rest 111 optionally include a mechanism 116 configured to change the angle between the seat 104 and the back-rest 102.

In some embodiments, an angle change of the arm-rests is optionally performed by an electric actuator 1002 (see FIG. 10) connected to the arm-rest, optionally controlled by a controller, optionally having a program which define chair component positions in respect to other chair component positions, or actuator positions relative to other actuator positions, or moves independently of other actuators, optionally by user command.

In some embodiments, an angle between the arm-rest 111 and the back-rest 102 and/or the angle between the arm-rest 111 and the seat 104 may change, as can be seen in FIGS. 1 to 4.

In some embodiments, the chair enables a user to change a position of the chair to any position, with legs down, up, back-rest up, down, to a tilting position, to a Trendelenburg position, and so on (see FIGS. 1-4, 6A-10).

In some embodiments, the chair 100 may have a size of a standard chair or arm-chair. The chair 100 is provided in different dimensions, to allow smaller and bigger users.

In some embodiments, the footboard 108 is optionally connected with slides to the leg-rest 106, so that the footboard 108 may move in and out. In some embodiments, the movement in and out is potentially useful for physical therapy of the user.

In some embodiments, the footboard optionally includes a sensor, which optionally sends a signal when the footboard is pressed by the user.

In some embodiments, the footboard includes an integrated scale, for optional use in weighing a user.

In some embodiments, the footboard optionally includes a sensor on its outer side, which can be used for potentially preventing the footboard from pressing on an object or a person.

In some embodiments, the chair includes one or two armrests. In some embodiments, the armrests may optionally include one or two handles 114*a* 114*b* 644. In some embodiments, the handle(s) control operation of at least some functions of the chair by the user. Potentially also providing a safe grip.

The arm-rest 111 and/or the support handle 114*a* 114*b* 644 optionally have a control button 502 and/or 504 to electrically operate the chair to move the chair to various positions, such as a standing or lying position, but can also move the user to any seating angle position.

In some embodiments, the arm-rest may optionally include an additional operating button, such as reference 502 in FIG. 5A, at a location which enables the user to reach the operating button while in lying position or other positions of the chair.

In some embodiments, the chair optionally includes a tablet 602 connected to an operating system and/or controller of the chair via one or more of Wi-Fi, Infra-Red, physical wire, Bluetooth, and/or other commercial connectivity methods.

Optional Compatibility of Technology for the Tablet.

In various embodiments, the tablet is optionally running one of the following operations systems, or an operating system compatible with: IOS (typically used for Apple and Mac systems), Android, Windows, Linux, Raspberry Pi, and so on.

Tablet Capabilities and Functionality

In various embodiments, the tablet is part of the chair and is able to operate the chair. In some embodiments, the tablet may also be used for one or more of the following operations:

- Operate as phone;
- Control electronics at home (e.g. Smart Home);
- Any application, such as an emergency call, medicine reminder and control, any communication App;
- A recording application; and
- Wi-Fi/Bluetooth/RF wireless connectivity or some other connectivity available in the tablet;

In some embodiments, the tablet may include a camera.

In some embodiments, the camera sends pictures of the user when a user is detected to be in a certain position.

In some embodiments the pictures of the user are optionally compared to pictures of the same user taken when the user is considered in a reference state, and if a change is detected from the reference state an alert and/or warning is optionally initiated, and/or a message is sent to a caretaker.

In some embodiments the pictures of the user on the chair are optionally compared to a picture of the chair, and if the user's body extends out of a specific outline, an alert and/or warning is optionally initiated, and/or a message is optionally sent to the user and/or to a caretaker.

In some embodiments, the camera optionally detects when a user is sitting in the chair. In some embodiments, if the user is not sitting in the chair at a specific defined time, the tablet optionally sends a signal or calls a pre-defined third party or system, optionally providing an alert.

In some embodiments, the camera optionally identifies a bad position of the user, for example the user's head falling to the side or to the front.

In some embodiments, the camera optionally views and detects other pre-defined characteristics of the user, and in case the user's characteristics do not meet pre-defined characteristics, the tablet optionally notifies a pre-defined third party/system, of such incident.

In some embodiments, the tablet optionally reminds the user to take medication.

In some embodiments, the tablet optionally reminds the user to exercise.

In some embodiments, the chair is optionally operated by voice recognition.

In some embodiments, the tablet is optionally connected to a Vital Signs diagnostic program, and collects, optionally stores, and optionally transmits, vital signs of the user.

In some embodiments, the tablet optionally sends information to a predefined contact in case the vital signs do not meet a predefined range.

In some embodiments, the Vital Sign connectivity optionally sends information to the "Cloud" and/or to a predefined program for determining the medical condition of the user, and to optionally signal in case of a health problem of the user.

In some embodiments, the tablet optionally collects and records and/or transmits chair positions, potentially enabling providing a history of the chair use.

In some embodiments, the chair optionally includes a power drive for driving the chair and a user along the floor.

In some embodiments, the chair optionally includes one or more inflatable sleeves for preventing a user from falling out of the chair and to support the user in a standing position.

In some embodiments, the inflatable sleeve(s) may come from one or both sides of the chair or components of the chair (arm-rests, back-rest, leg-rest, seat) supporting different areas of the body, such as arms, chest, knees, feet, waist etc.

In some embodiments, the sleeves are optionally connected to an air compressor and can be controlled in a way that the user is enabled to activate and deactivate the sleeves. In some embodiments, inflation and/or deflation of the inflatable sleeves is optionally automatically controlled, optionally based on chair position.

In some embodiments, the inflatable sleeves optionally include a pressure sensor for adjusting the amount or pressure on the body.

In some embodiments, the chair optionally includes a massage function.

In some embodiments, the chair optionally includes an inflatable part on the back side of user, to prevent the user from feeling massage components when not in use. The inflatable part is optionally inflated when the massage function is not in use and deflated when the massage function is in use.

Figure 14:
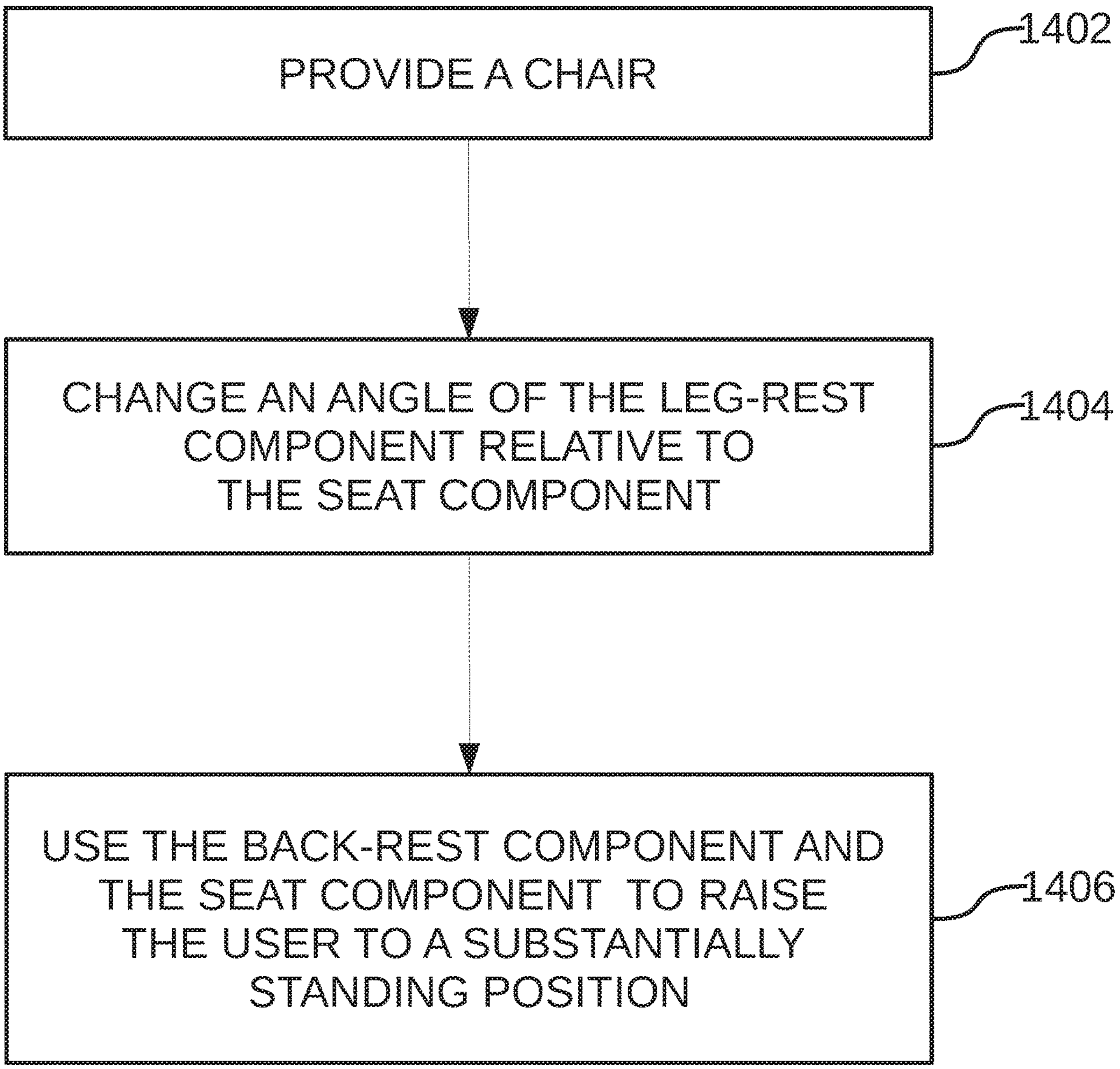
FIG. 14 is a simplified illustration of a flow chart of a method for assisting a user to stand up from a chair in accordance with some embodiments of the disclosure.

Reference is now made to FIG. 14, which is a simplified illustration of a flow chart of a method for assisting a user to stand up from a chair in accordance with some embodiments of the disclosure.

The method shown by FIG. 14 includes:

providing a chair (1402), the chair including:
- a base component;
- a seat component connected to the base component by a central hinge;
- a leg-rest component, connected to the seat component by a leg-rest hinge; and
- a back-rest component connected to the seat component by a back hinge;

changing an angle of the leg-rest component relative to the seat component (1404) to make the leg-rest component substantially parallel to the seat component, enabling a user's leg to be approximately straight;

using the back-rest component and/or the seat component, to raise and/or tilt the user to a substantially standing position (1406), thereby assisting the user to stand up from the chair.

In some embodiments, enabling a user's leg to be approximately straight enables the user's knee to be locked, to support the user's weight.

In some embodiments, the chair includes a footboard component, and the footboard is brought to touch the user's feet before lifting the user to the standing position, optionally supporting a gradually and/or smoothly increasing percentage of the user's weight on the footboard.

In some embodiments, when the user is tilted toward a standing position, the footboard optionally moves out, and when the chair is almost vertical, the footboard optionally substantially touches the floor.

In some embodiments, at least one handle is included in the chair and positioned for the user to grasp while being assisted to stand up, to prevent the user from falling forward.

In some embodiments, the chair includes at least one arm-rest arranged to be approximately parallel to the floor while the user is being assisted to stand up, for the user to rest the user's arm and at least partially support the user's weight.

It is noted that in some embodiments of the handle, such as reference 114*a* of FIGS. 1 and 2, reference 114*b* 114*c* of FIGS. 3, 4, and 9, reference 644 of FIGS. 6A and 6B, are designed, by virtue of their linkages and/or actuators, to change angle with respect to the floor, when the chair tilts and/or changes its position, and when the back-rest changes its angle with respect to the seat.

In some embodiments, a rate of assisting the user to stand up from the chair is optionally automatically changed based on an elapsed time from a time when the user had a surgical procedure. For example, the rate is increased as the time elapsed following a knee surgery or a hip surgery increases.

Figure 15:
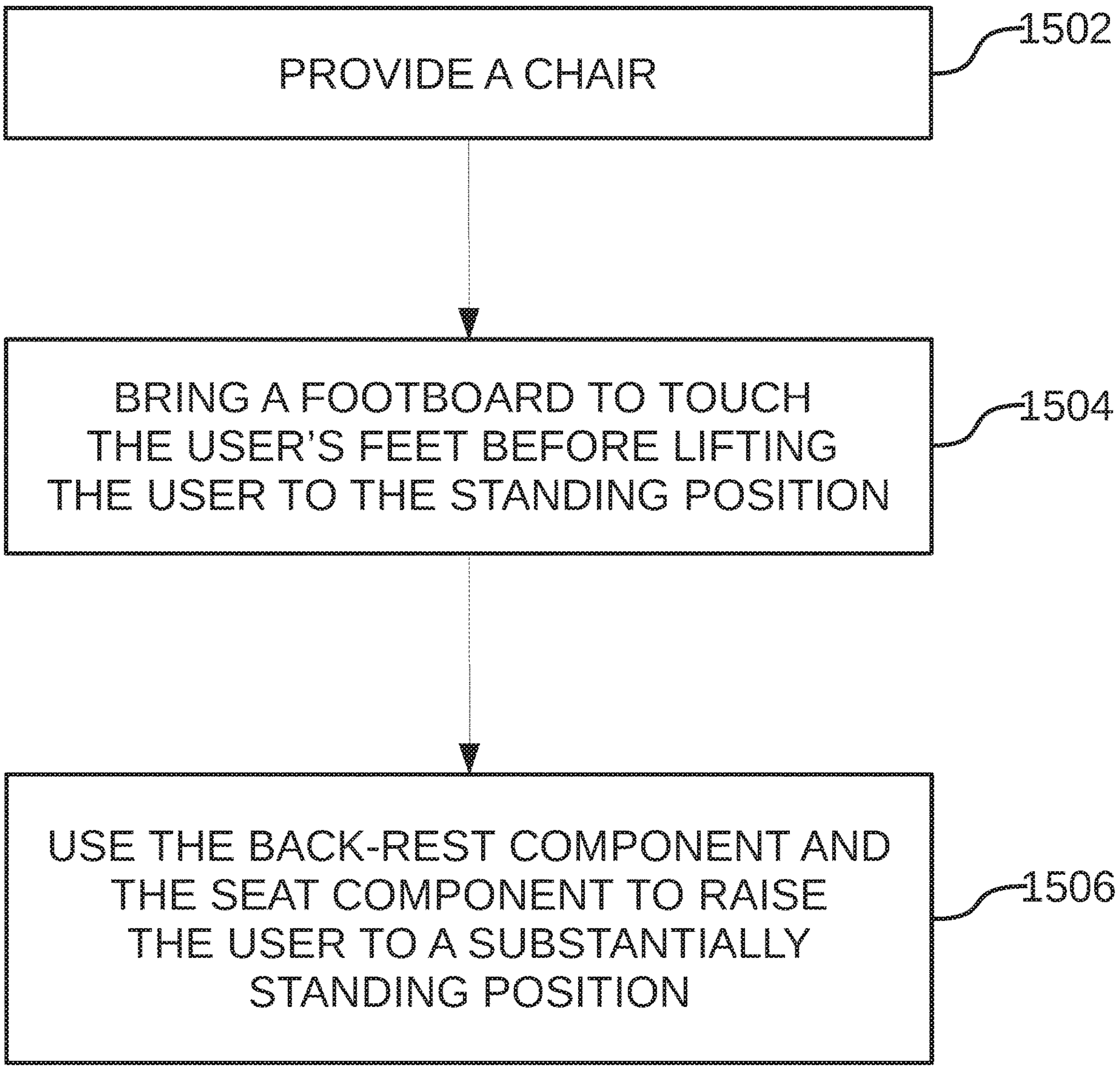
FIG. 15 is a simplified illustration of a flow chart of a method for assisting a user to stand up from a chair in accordance with some embodiments of the disclosure.

Reference is now made to FIG. 15, which is a simplified illustration of a flow chart of a method for assisting a user to stand up from a chair in accordance with some embodiments of the disclosure.

The method shown by FIG. 15 includes:

- providing a chair (1502), the chair including:
  - a base component;
  - a seat component connected to the base component by a central hinge;
  - a back-rest component connected to the seat component by a back hinge; and
  - a footboard component;
- bringing the footboard to touch the user's feet (1504) before lifting the user to the standing position; and
- using the back-rest component and the seat component, to raise the user to a substantially standing position (1506), thereby assisting the user to stand up from the chair.

In some embodiments, the chairs of the methods of FIG. 14 and FIG. 15 are chairs in accordance with some embodiments of the disclosure, as described herein. By way of a non-limiting example the chairs optionally include a base component; a seat component connected to the base component by a central hinge; and a back-rest component connected to the seat component by a back hinge, such that when the chair is in a sitting position, the seat component is lower than the central tilting hinge.

It is expected that during the life of a patent maturing from this application many relevant actuators will be developed and the scope of the term actuator is intended to include all such new technologies a priori.

It is expected that during the life of a patent maturing from this application many relevant computing devices, will be developed and the scope of the term tablet is intended to include all such new technologies a priori.

As used herein with reference to quantity or value, the term "approximately" means "within ±20% of".

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

In addition, any priority document(s) of this application is/are hereby incorporated herein by reference in its/their entirety.

What is claimed is:

1. A chair comprising:

a base component;

a seat component connected to the base component by a central hinge;

a leg-rest component, connected to the seat component by a leg-rest hinge; and a back-rest component connected to the seat component by a back hinge, wherein each one of said seat component, said leg-rest, and said back-rest is selectively movable relative to another of said seat component, said leg-rest, and said back-rest, and wherein when the chair is in a sitting position, the seat component is lower than the central hinge.

2. The chair according to claim 1, and further including at least one actuator for changing an angle between components of the chair.

3. The chair according to claim 2, wherein at least one of the actuators is one of an electric actuator and a hydraulic actuator.

4. The chair according to claim 1, and further including a seat tilt actuator for changing an angle between the seat component and the base component.

5. The chair according to claim 1, and further including a back-rest actuator for changing an angle between the back component and the seat component.

6. The chair according to claim 1, and further including a leg-rest actuator for changing an angle between the leg-rest component and the seat component.

7. The chair according to claim 1, and further including a footboard component connected to the leg-rest component.

8. The chair according to claim 7, wherein the footboard is designed to move toward and away-from feet of a user sitting in the chair.

9. The chair according to claim 8, and further including a footboard actuator for moving the footboard component toward and away from feet of a user sitting in the chair.

10. The chair according to claim 9, and further comprising a contact sensor configured to send a signal upon contact of the contact sensor with an object.

11. The chair according to claim 1, and further including a controller for controlling at least one actuator.

12. The chair according to claim 11, and further including a processor for programming the controller.

13. The chair according to claim 1, and further including an arm-rest component.

14. The chair according to claim 13, wherein the arm-rest component is configured to change angle relative to the seat component according to a change of angle between the back-rest and the seat.

15. The chair according to claim 13, and further comprising a handle component attached to the arm-rest component.

16. The chair according to claim 15, wherein the handle component is configured to change angle relative to the arm-rest component when the back-rest changes angle relative to the seat.

17. The chair according to claim 15, wherein the handle component is configured to change angle relative to the seat when the back-rest changes angle relative to the seat.

18. The chair according to claim 1, and further including an inflatable sleeve for supporting a user, wherein said inflatable sleeve is located on one of said leg-rest component and said back-rest component.

19. The chair according to claim 18, and further including an air compressor for inflating the inflatable sleeve.

20. The chair according to claim 18, wherein the chair is configured to automatically inflate and deflate the inflatable sleeve.

21. The chair according to claim 18, and further including a pressure sensor for measuring pressure in the inflatable sleeve.

22. The chair according to claim 1, and further including a tablet for controlling the chair.

23. The chair according to claim 22, wherein the controlling the chair is designed to be performed by a method selected from a group consisting of:

activating a touch-screen control;

pressing a button;

voice recognition;

detecting eye movement; and detecting gaze direction.

24. The chair according to claim 22, wherein the tablet comprises a camera, and the tablet is further configured to perform at least one action selected from a group consisting of:

producing an image of a user in the chair;

producing a video of a user in the chair; and analyzing user position in the chair.

25. The chair according to claim 1, and further comprising components for providing a massage action.

26. A method for assisting a user to stand up from a chair, the method comprising:

providing a chair, the chair comprising:

a base component;

a seat component connected to the base component by a central hinge such that when the chair is in a sitting position, the seat component is lower than the central hinge;

a leg-rest component, connected to the seat component by a leg-rest hinge; and a back-rest component connected to the seat component by a back hinge;

changing an angle of the leg-rest component relative to the seat component to make the leg-rest component substantially parallel to the seat component, enabling a user's leg to be approximately straight; and using chair components to raise the user to a substantially standing position, thereby assisting the user to stand up.

27. The method of claim 26 wherein using chair components to raise the user to a substantially standing position comprises one of:

using the seat component to raise the user to a substantially standing position;

using the back-rest component to raise the user to a substantially standing position;

using the back-rest component and the seat component to raise the user to a substantially standing position; and using the leg-rest component to raise the user to a substantially standing position.

28. The method of claim 26, wherein:

the chair comprises a footboard component; and the footboard is brought to touch the user's feet before lifting the user to the standing position.

29. The method of claim 28, wherein when the user is tilted to a standing position, the footboard moves towards the floor and substantially touches the floor.

30. The method of claim 26, and further providing at least one handle positioned for the user to grasp while being assisted to stand up to prevent the user from falling forward.

31. The method of claim 26, and further providing at least one arm-rest positioned approximately parallel to the floor for the user to rest the user's arm while being assisted to stand up, to at least partially support the user's weight.

32. The method of claim 26, wherein movement of the chair is controlled by a tablet.

33. The method of claim 32, wherein a rate of assisting the user to stand up from the chair is automatically changed based on an elapsed time programmed in the tablet.

34. A method for assisting a user to stand up from a chair, the method comprising:

providing a chair, the chair comprising:

a base component;

a seat component connected to the base component by a central hinge such that when the chair is in a sitting position, the seat component is lower than the central hinge;

a back-rest component connected to the seat component by a back hinge; and a footboard component;

bringing the footboard to touch the user's feet before lifting the user to the standing position; and using chair components to raise and tilt the user to a substantially standing position, thereby assisting the user to stand up;

wherein, when the user is in the substantially standing position, the central hinge is located in front of the seat component.

35. The method of claim 34, wherein using chair components to raise the user to a substantially standing position comprises at least one of:

using the seat component to raise the user to a substantially standing position;

using the back-rest component to raise the user to a substantially standing position;

using the back-rest component and the seat component to raise the user to a substantially standing position; and using a leg-rest component to raise the user to a substantially standing position.

36. The chair according to claim 1, and further including an arm-rest component and an inflatable sleeve for supporting a user, wherein said inflatable sleeve is located on said arm-rest component.

37. The chair according to claim 1 wherein, when in said sitting position, said leg-rest hinge is at a first vertical distance relative to said base component; and wherein, when in said standing position, said leg-rest hinge is at a second vertical distance relative to said base component, wherein said second vertical distance is greater than said first vertical distance.

* * * * *